(12) United States Patent
Pedersen

(10) Patent No.: US 9,288,137 B2
(45) Date of Patent: Mar. 15, 2016

(54) SYSTEMS AND METHODS FOR ALLOCATION OF CLASSES OF SERVICE TO NETWORK CONNECTIONS CORRESPONDING TO VIRTUAL CHANNELS

(75) Inventor: Bradley J. Pedersen, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 142 days.

(21) Appl. No.: 13/103,318

(22) Filed: May 9, 2011

(65) Prior Publication Data

US 2011/0276699 A1    Nov. 10, 2011

Related U.S. Application Data

(60) Provisional application No. 61/332,803, filed on May 9, 2010.

(51) Int. Cl.
| | | |
|---|---|---|
| *G06F 15/16* | (2006.01) | |
| *H04L 12/707* | (2013.01) | |
| *H04L 12/927* | (2013.01) | |
| *H04L 12/851* | (2013.01) | |

(Continued)

(52) U.S. Cl.
CPC .............. *H04L 45/24* (2013.01); *H04L 47/10* (2013.01); *H04L 47/24* (2013.01); *H04L 47/2475* (2013.01); *H04L 47/621* (2013.01); *H04L 47/6215* (2013.01); *H04L 47/803* (2013.01); *H04L 47/805* (2013.01); *H04L 47/808* (2013.01)

(58) Field of Classification Search
CPC ... H04L 47/10; H04L 47/2475; H04L 47/621; H04L 47/6215; H04L 47/6295; H04L 47/803; H04L 47/805; H04L 47/808; H04L 47/24; H04L 47/2433; H04L 45/24
See application file for complete search history.

(56) References Cited

U.S. PATENT DOCUMENTS

| 5,519,689 A | 5/1996 | Kim |
| 5,913,074 A | 6/1999 | Ikeda et al. |

(Continued)

FOREIGN PATENT DOCUMENTS

| EP | 1 063 818 | 12/2000 |
| EP | 1 718 011 | 8/2009 |

OTHER PUBLICATIONS

International Preliminary Report on Patentability on PCT/US2011/035718 dated Nov. 22, 2012.

(Continued)

*Primary Examiner* — Patrice Winder
*Assistant Examiner* — Nam Tran
(74) *Attorney, Agent, or Firm* — Foley & Lardner LLP; John D. Lanza

(57) ABSTRACT

A system for allocating a different class of service to each network connection in a plurality of network connections, where each network connection corresponds to one or more virtual channels. The system can include a plurality of virtual channels that connect a first computer and a second computer. Each virtual channel can service at least a portion of the network traffic generated using a remote-display protocol. The system can also include a plurality of network connections, where each network connection corresponds to at least one of the virtual channels. Each network connection of the system can have an assigned port number and an assigned class of service that corresponds to a transmission priority level. The class of service assigned to each network connection can be unique from the classes of service assigned to other network connections.

19 Claims, 18 Drawing Sheets

(51) Int. Cl.
*H04L 12/859* (2013.01)
*H04L 12/863* (2013.01)
*H04L 12/801* (2013.01)

(56) References Cited

U.S. PATENT DOCUMENTS

| | | | |
|---|---|---|---|
| 6,005,851 A * | 12/1999 | Craddock et al. | 370/329 |
| 2005/0063394 A1* | 3/2005 | Ko | 370/397 |
| 2005/0267972 A1* | 12/2005 | Costa-Requena et al. | 709/227 |
| 2007/0083610 A1 | 4/2007 | Treder et al. | |
| 2008/0225721 A1* | 9/2008 | Plamondon | 370/235 |
| 2009/0028151 A1* | 1/2009 | Schmidt | 370/392 |
| 2010/0095025 A1 | 4/2010 | Ko | |

OTHER PUBLICATIONS

International Search Report on PCT/US2011/035718 dated Jan. 2, 2012.
Written Opinion on PCT/US2011/035718 dated Jan. 2, 2012.
Chinese Office Action on 2011800335014 dated Aug. 23, 2013.
Chinese Office Action on 2011800335014 dated Jan. 16, 2014.
Decision of Rejection on 2011800335014 dated Jul. 31, 2014.
European Examination Report on 11781071.3 dated Apr. 8, 2015.
Extended European Search Report on 11781071.3 dated Jun. 13, 2014.

* cited by examiner

SYSTEMS AND METHODS FOR ALLOCATION OF CLASSES OF SERVICE TO NETWORK CONNECTIONS CORRESPONDING TO VIRTUAL CHANNELS

RELATED APPLICATIONS

This present application claims priority to and the benefit of U.S. Provisional Patent Application No. 61/332,803, entitled "Allocation of Classes of Service to Network Connections Corresponding to Virtual Channels," filed May 9, 2010, which is hereby incorporated by reference in its entirety.

FIELD OF THE INVENTION

The methods and systems described herein relate generally to transmitting remote-display protocol data over one or more virtual channels. In particular, the methods and systems relate to transmitting data over virtual channels via corresponding transport layer connections with different classes of service.

BACKGROUND OF THE INVENTION

Systems that obtain and remotely display application data on a client machine often transmit a large volume of information over a network connection using virtual channels. In many instances, this data can include image data, audio data, video data, configuration data, and other types of data. Typically, a single transport layer connection between a remote display client and a server may be used for all communications. One remote display client is an Independent Computing Architecture (ICA) client. In the ICA protocol, multiple "virtual streams or channels" may be used and assigned priorities, the priorities dependent on the communication latency requirements of the data within each virtual stream or channel. Multiple virtual channels may be carried by the single transport layer connection, and may be multiplexed or queued together according to the assigned priorities of the virtual channels. For example it may be desirable to maintain low latency for GUI interactions to improve human perceived responsiveness. To achieve this, GUI interaction events may be sent in the high priority virtual channel, while bulk data transfers (file copy for example) may be sent in the low priority channel. Multiplexing and queuing may occur via various algorithms, including weighted round robin with a high priority virtual channel having a greater weight than a low priority virtual channel; an immediate transmission rule for bursty high priority virtual channel data with buffering of lower priority virtual channel data; mixed first-in/first-out and first-in/last-out queuing; or any other type and form of weighting.

This prioritization of virtual channel data occurs prior to transmitting the data over the transport layer connection. As a result, while high priority virtual channels may be prioritized relative to low priority virtual channels within the same transport layer communication, the entire transport layer connection may only have a single priority, and thus, it is not possible to assign priority levels or importance levels outside of the remote session. For example, a network administrator cannot assign a priority level to a specific virtual channel on the network. Rather, the administrator can only assign a priority level to an entire remote session.

Furthermore, while there exist network products that can dynamically change the priority of the entire remote session based on the packet tags of the remote protocol, these solutions typically require the network product to look into the application, session or presentation layer data payload of the transport layer packets. Most networking equipment, such as routers and switches, cannot do this and cannot dynamically change the priority of a TCP or UDP session. Rather, the priority must be fixed.

As a result, a remote session with multiple virtual channels carrying high priority voice data, medium priority GUI data, and low priority printer data, may be transmitted via a single transport layer connection with a single priority. If this priority is high, the latency needs of the high priority data are satisfied, but the low priority data is likewise transmitted at a high priority, adversely impacting other sessions with actual high priority data. Similarly, if the transport layer connection is transmitted at a low priority, bandwidth that is efficiently used for low priority email may be insufficient for voice communications, causing latency and a negative user experience. Downsides to assigning the same priority to all network traffic generated by a remote session thus include transmitting high priority data, e.g. video and audio, at the same priority level as printer data. For example, a user may request access to a remote voice over IP application, however due to network congestion created by remote session and non-remote session traffic, the user may experience poor audio quality due to delayed data packets. While in some instances an administrator could raise the priority level of the entire remote session, the priority level necessary to mitigate the network latency affect on the VoIP application would likely cause non-remote-session and other remote session network traffic to suffer. Thus, methods and systems for assigning different priority levels or quality of service levels to individual virtual channels within a remote session are needed to improve an end user's experience.

SUMMARY OF THE INVENTION

Described herein methods and systems for establishing multiple transport layer connections to carry traffic generated by a remote application session. Each transport layer connection can have a different quality of service, class of service or priority level, and each transport layer connection can carry network traffic transmitted over a particular virtual channel. Thus, each virtual channel within the remote application session can be associated with a different class of service and can be transported over the corresponding transport layer connection. In some embodiments, a network administrator can prioritize each transport layer connection using classes of service and port numbers such that each transport layer connection has a different priority level than other transport layer connections. For example, a first transport layer connection can have a highest priority level and can transmit real-time information such as audio and video conferencing information. Another transport layer connection can have a lower priority level and can transmit image data and image commands, while another TCP or UDP connection can have a still lower priority level and can transmit scanner data and drive mapping information. Yet another TCP connection can have the lowest priority level and can transmit print commands.

In one aspect described herein are methods and systems for allocating a different class of service to each network connection in a plurality of network connections, where each network connection corresponds to one or more virtual channels. A plurality of virtual channels of the system connect a first computer to a second computer, where each virtual channel services at least a portion of network traffic that is generated using a presentation level protocol or a remote-display protocol. A plurality of network connections are included in the system, where each network connection corresponds to at least one of the virtual channels. Each of the network connections may have an assigned port number and an assigned class of service that corresponds to a transmission priority level. The assigned class of service for one network connection may be unique from classes of service assigned to other network connections.

In one aspect, the present application is directed to a system for allocating a different class of service to each network connection of a plurality of network connections, where each network connection corresponds to one or more virtual channels. The system comprises a first computing device and a second computing device. The second computing device is in communication with the first computing device via a remote-display protocol session. The remote-display protocol session includes a plurality of virtual channels, each servicing at least a portion of network traffic of the remote-display protocol session. The second computing device is also in communication with the first computing device via a plurality of transport layer network connections comprising a network connection between the first computing device and the second computing device, a first transport layer network connection carrying a first virtual channel and assigned a first class of service and a second transport layer network connection carrying a second virtual channel and assigned a second class of service, the second class of service different from the first class of service. The remote-display protocol session is thus carried by, transmitted via, or encapsulated by the plurality of transport layer network connections.

In one embodiment, the first transport layer network connection is assigned a first port number and the second transport layer network connection is assigned a second port number, the second port number different from the first port number. In a further embodiment, the first port number is based on the type of data communicated via the first virtual channel carried by the first transport layer network connection, and wherein the second port number is based on the type of data communicated via the second virtual channel carried by the second transport layer network connection.

In some embodiments, the first class of service corresponds to a first transmission priority of the first virtual channel carried by the first transport layer network connection, and the second class of service corresponds to a second transmission priority of the second virtual channel carried by the second transport layer network connection. In a further embodiment, the first transmission priority is different from the second transmission priority. In another further embodiment, the first transmission priority is based on the type of data communicated via the first virtual channel carried by the first transport layer network connection, and wherein the second transmission priority is based on the type of data communicated via the second virtual channel carried by the second transport layer network connection.

In another aspect, the present application is directed to a method for allocating a different class of service to each network connection of a plurality of network connections, where each network connection corresponds to one or more virtual channels. The method includes transmitting, by a first computing device, remote-display protocol data of a first virtual channel of a remote-display protocol session via a first transport layer network connection to a second computing device. The first transport layer network connection is assigned a first class of service. The method also includes transmitting, by the first computing device, remote-display protocol data of a second virtual channel of the remote-display protocol session via a second transport layer network connection to the second computing device. The second transport layer connection is assigned a second class of service different from the first class of service.

In some embodiments, the first transport layer network connection is assigned a first port number, and the second transport layer network connection is assigned a second port number different from the first port number. In other embodiments, the first class of service is based on a type of remote display protocol data of the first virtual channel, and the second class of service is based on a type of remote display protocol data of the second virtual channel.

In one embodiment, the first class of service is based on a first transmission priority of the first virtual channel, and the second class of service is based on a second transmission priority of the second virtual channel different from the first transmission priority. In a further embodiment, the method includes transmitting remote display protocol data of the first virtual channel of the remote display protocol session via the first transport layer network connection to the second computing device via an intermediary computing device performing traffic prioritization based on the first class of service. The method also includes transmitting remote-display protocol data of the second virtual channel of the remote display protocol session via the second transport layer network connection to the second computing device via the intermediary computing device performing traffic prioritization based on the second class of service. In a still further embodiment, the intermediary computing device may perform traffic prioritization on either or both of the transport layer connections, agnostic to the remote display protocol data carried by the transport layer connections.

In some embodiments, the method includes determining to transmit remote-display protocol data of the first virtual channel of the remote display protocol session via the first transport layer network connection, responsive to the first class of service and one of a content type, application type, or user of the data. In some embodiments, the class of service may be determined by content type, application type, or user of the data.

In yet another aspect, the present application is directed to a method for allocating a different class of service to each network connection in a plurality of network connections, where each network connection corresponds to one or more virtual channels. The method includes establishing, by a first computing device, a remote-display protocol session with a second computing device via a first transport layer connection. The first transport layer connection is assigned a first class of service and the remote-display protocol session comprises a plurality of virtual channels. The method also includes establishing, by the first computing device, a second transport layer connection with the second computing device. The second transport layer connection is assigned a second class of service different from the first class of service. The method further includes transmitting, by the first computing device, remote-display protocol data of a first virtual channel of the remote-display protocol session via the first transport layer connection, responsive to a priority of the first virtual channel corresponding to the first class of service. The method also includes transmitting, by the first computing device, remote-display protocol data of a second virtual channel of the remote-display protocol session via the second transport layer connection, responsive to a priority of the second virtual channel corresponding to the second class of service.

In some embodiments, the method includes the first computing device transmitting a request to establish the remote-display protocol session to the second computing device. In other embodiments, the method includes the first computing device establishing the remote-display protocol session responsive to receiving a request to establish the remote-display protocol session from the second computing device. In one embodiment, the method includes the first computing device transmitting a request to establish the second transport layer connection to the second computing device. In another embodiment, the method includes the first computing device establishing the second transport layer request responsive to receiving a request to establish the second transport layer connection from the second computing device.

In some embodiments, the method includes establishing the second transport layer connection responsive to the priority of the second virtual channel being different from the priority of the first virtual channel. In other embodiments, the method includes transmitting the remote-display protocol data via an intermediary computing device performing traffic prioritization based on the first class of service, and transmitting the remote-display protocol data via the intermediary computing device performing traffic prioritization based on the second class of service. In a further embodiment, the intermediary computing device may perform traffic prioritization of either or both of the transport layer connections, agnostic to the remote-display protocol data of the virtual channels.

In some embodiments, the priority of the first virtual channel is assigned responsive to one of a content type, application type, or user of the remote-display protocol data of the first virtual channel, and the priority of the second virtual channel is assigned responsive to one of a content type, application type, or user of the remote-display protocol data of the second virtual channel.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
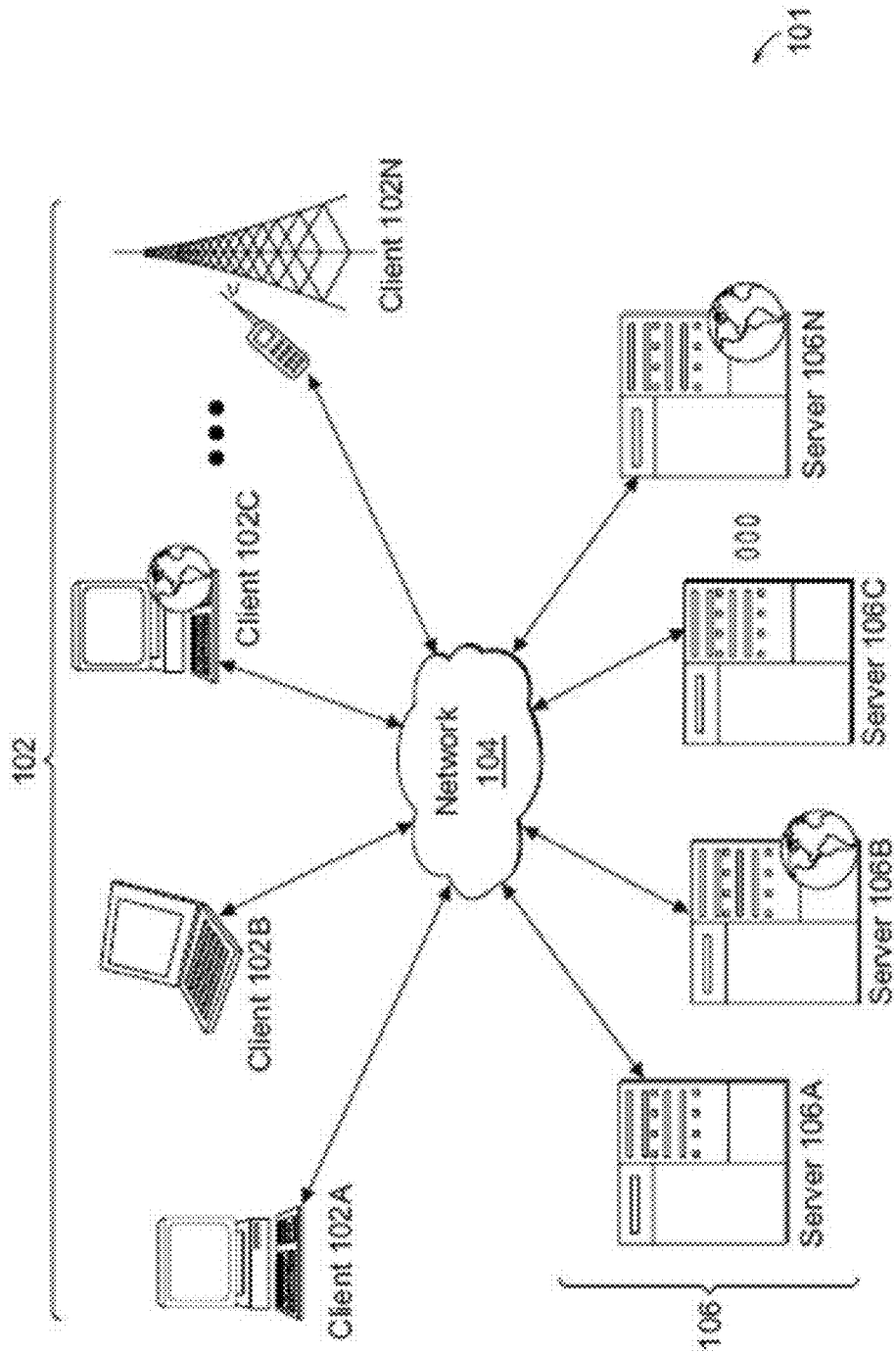
FIG. 1A is a block diagram illustrative of an embodiment of a remote-access, networked environment with a client machine that communicates with a server.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user; and Section C describes embodiments of systems and methods for allocating a different class of service to each network connection in a plurality of network connections, where each network connection corresponds to one or more virtual channels.

A. Network and Computing Environment

Prior to discussing the specifics of embodiments of the systems and methods of an appliance and/or client, it may be helpful to discuss the network and computing environments in which such embodiments may be deployed.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network. The network may comprise one or more network segments and one or more intermediary computing devices, including routers, switches, accelerators, firewalls, appliances, or other devices. In one embodiment, the computing environment 101 can include an appliance installed between the server(s) 106 and client machine(s) 102. This appliance can manage client/server connections, and in some cases can load balance client connections amongst a plurality of backend servers. In other embodiments, the computing environment 101 may include a router installed between server(s) 106 and client machine(s) 102. The router may be configured to perform network quality of service (QoS) mechanisms, including traffic shaping, prioritization, buffering, scheduling, congestion avoidance and other techniques, discussed in more detail below.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop. In still other embodiments, the application may comprise a word processing application, such as Microsoft Word, or an email application, such as Outlook, both manufactured by Microsoft Corporation of Redmond, Wash.; or any other type and form of application.

The server 106, in some embodiments, executes a remote presentation service or other program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; or the PCoIP protocol.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform such as any type of server operating system. In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial in user service. In embodiments where the server 106 comprises an appliance, the server 106 can be an appliance manufactured by any one of the following manufacturers: the Citrix Systems; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications or desktops available to the client machine 102 and well as address information associated with an application server 106 hosting an application or desktop identified within the enumeration of applications or desktops. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of an application server product by Citrix Systems, Inc. like the METAFRAME or CITRIX PRESENTATION SERVER or XenApp or XenDesktop; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
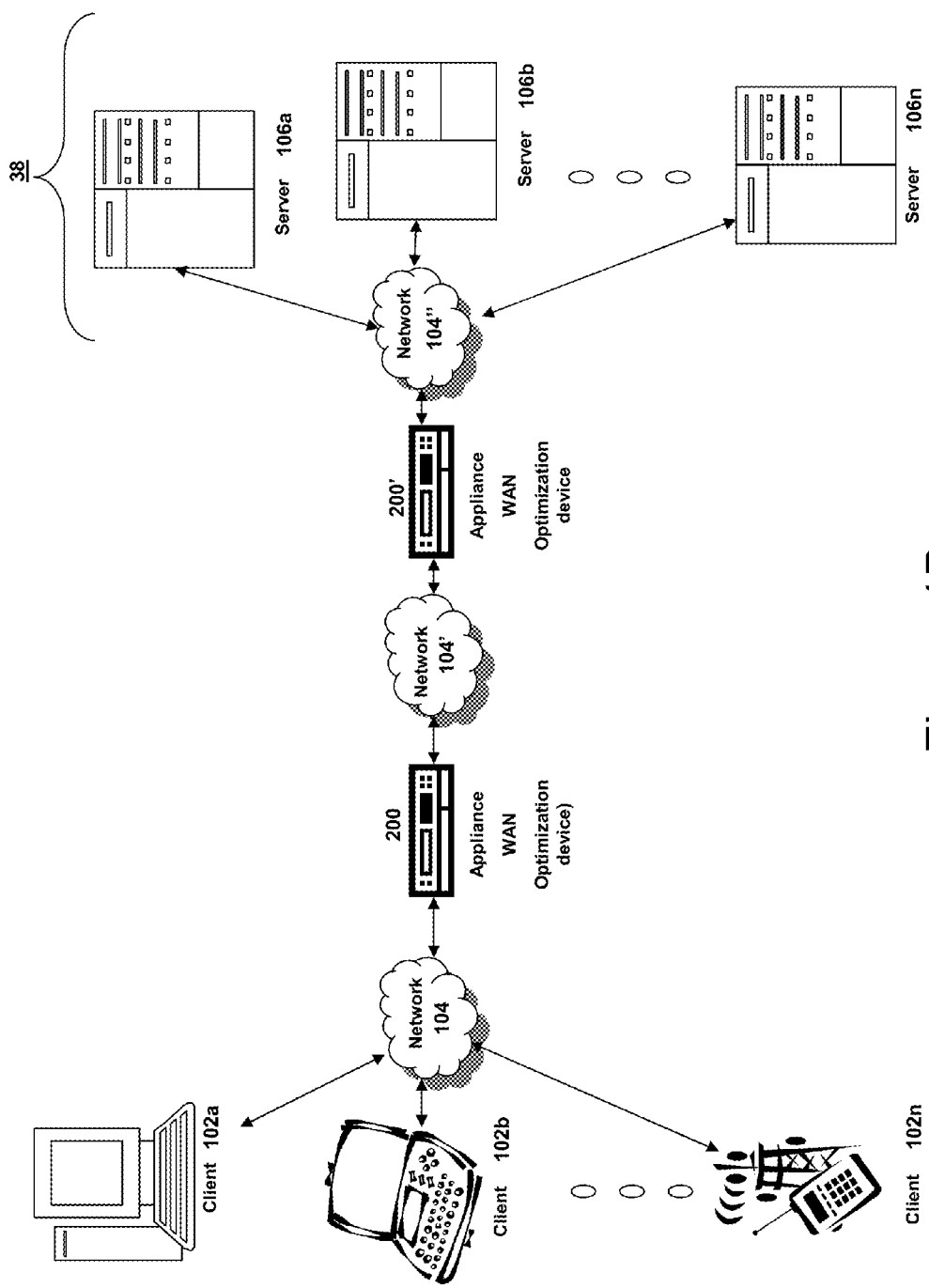
FIG. 1B is a block diagram of an embodiment of a network environment for a client to access a server via one or more network optimization appliances.

Referring now to FIG. 1B, another embodiment of a network environment is depicted. In brief overview, the network environment has one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN related network traffic between a client in the branch office and a server on the corporate LAN.

Although FIG. 1B shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

In some embodiments, one or more computing devices on the network may perform network traffic engineering or quality of service (QoS) mechanisms. The computing devices may comprise routers deployed as intermediaries or other intermediary computing devices. In some embodiments, QoS may be performed by a client agent or server agent installed on a client 102 or server 104. QoS mechanisms may be used to provide different priority of service to different applications, users, data flows or streams, or may be used to guarantee a required bit rate, minimum delay, jitter, packet drop rate, bit error rate, or other performance standard. For example, video data may require a high-bandwidth connection, voice communications may require a low delay or low jitter connection, or graphical user interface interactions may require a low latency connection, while email data, printer spooling information, or software updates may not have such stringent performance requirements.

In some embodiments, QoS mechanisms may comprise traffic shaping or packet shaping, scheduling or buffering, congestion avoidance techniques, or other logic, business rules, functions or operations for improving the performance, operation or quality of service of any of one or more network connections. In some embodiments, a device performing QoS may assign a priority to a communication, connection, data flow, packet or stream. The priority may be based on the connection, such as via a source or destination IP or port, or based on information in a packet header corresponding to the connection; based on the user that generated the communication or caused the communication to be generated, such as a guest user, root user, or administrator; based on an application that generated the data, such as a video server or printer server; based on an application that requested the data, such as a web browser or software update service; based on one or more metrics of the data, such as payload size, priority headers, protocol type at one or more layers of the OSI model, delay between packets, MTU size; or any other type of information. In some embodiments, packets may be assigned a priority or identified as having a particular priority by the inclusion of a Type of Service (ToS) field, or a Differentiated Services Code Point (DSCP or DiffServ) field. In other embodiments, a traffic flow may have priority resources reserved through a resource reservation protocol (RSVP) message or other reservation system.

In some embodiments, data assigned a high priority may be transmitted before data assigned a low priority, regardless of arrival time at the device, or via one or more scheduling algorithms such as weighted fair queuing, class based weighted fair queuing, weighted round robin, or any other type of scheduling mechanism that gives greater access to system resources to higher priority data. In other embodiments, data assigned a low priority may be rate limited, or have a window size adjusted to reduce a transmission rate, freeing up network bandwidth for higher priority data. In still other embodiments, the devices may implement congestion avoidance techniques including explicit congestion notification or TCP buffering.

As depicted in FIG. 1B, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at the branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as Branch Repeater manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 205 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol. Further details of the optimization techniques, operations and architecture of the appliance 200 are discussed below in Section B.

Still referring to FIG. 1B, the network environment may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Deployed with Other Appliances.

Figure 1C:
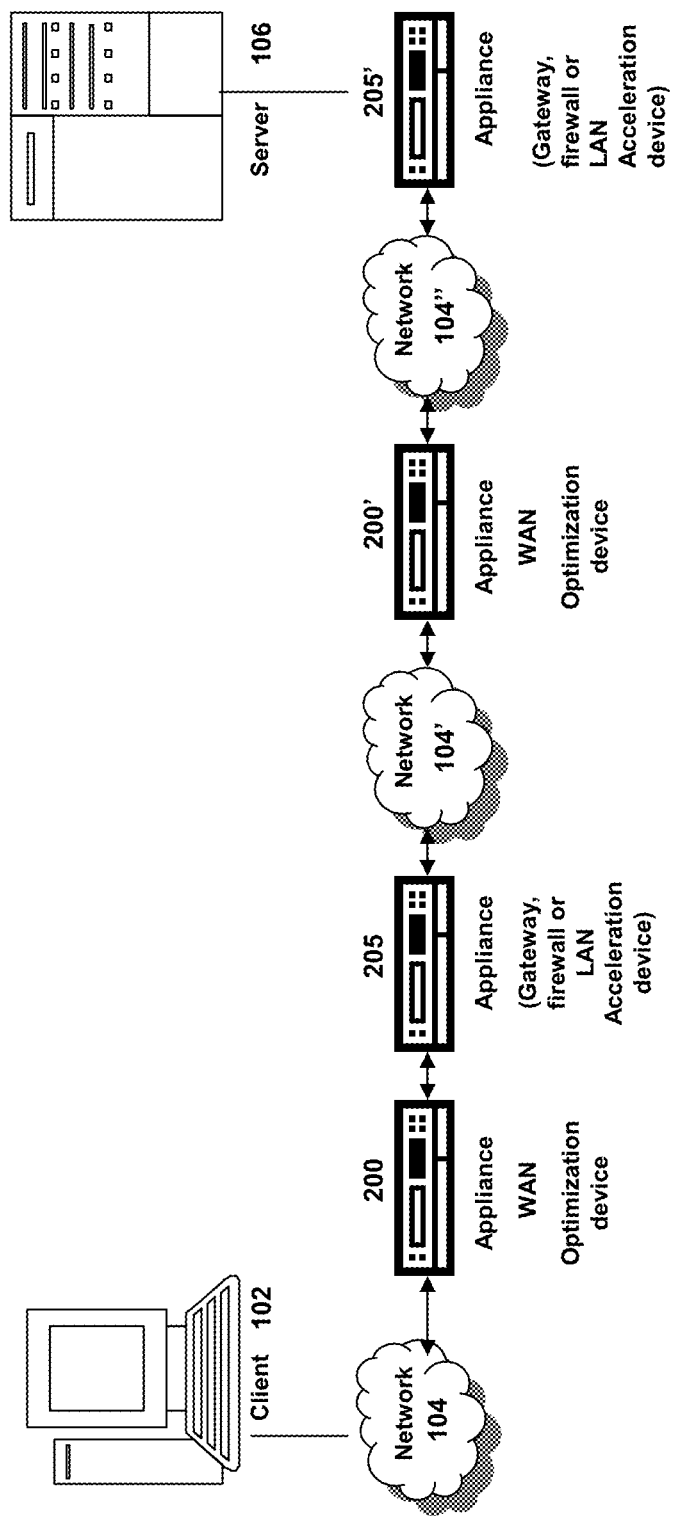
FIG. 1C is a block diagram of another embodiment of a network environment for a client to access a server via one or more network optimization appliances in conjunction with other network appliances.

Referring now to FIG. 1C, another embodiment of a network environment is depicted in which the network optimization appliance 200 is deployed with one or more other appliances 205, 205' (generally referred to as appliance 205 or second appliance 205) such as a gateway, firewall or acceleration appliance. For example, in one embodiment, the appliance 205 is a firewall or security appliance while appliance 205' is a LAN acceleration device. In some embodiments, a client 102 may communicate to a server 106 via one or more of the first appliances 200 and one or more second appliances 205.

One or more appliances 200 and 205 may be located at any point in the network or network communications path between a client 102 and a server 106. In some embodiments, a second appliance 205 may be located on the same network 104 as the first appliance 200. In other embodiments, the second appliance 205 may be located on a different network 104 as the first appliance 200. In yet another embodiment, a first appliance 200 and second appliance 205 is on the same network, for example network 104, while the first appliance 200' and second appliance 205' is on the same network, such as network 104".

In one embodiment, the second appliance 205 includes any type and form of transport control protocol or transport later terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in manner to effectively terminate the transport control protocol connection or to act or simulate as terminating the connection.

In some embodiments, the second appliance 205 is a performance enhancing proxy. In one embodiment, the appliance 205 provides a virtual private network (VPN) connection. In some embodiments, the appliance 205 provides a Secure Socket Layer VPN (SSL VPN) connection. In other embodiments, the appliance 205 provides an IPsec (Internet Protocol Security) based VPN connection. In some embodiments, the appliance 205 provides any one or more of the following functionality: network QOS, compression, acceleration, load-balancing, switching/routing, caching, and Transport Control Protocol (TCP) acceleration.

In one embodiment, the appliance 205 is any of the product embodiments referred to as Access Gateway, Application Firewall, Application Gateway, or NetScaler manufactured by Citrix Systems, Inc. of Ft. Lauderdale, Fla. As such, in some embodiments, the appliance 205 includes any logic, functions, rules, or operations to perform services or functionality such as SSL VPN connectivity, SSL offloading, switching/load balancing, Domain Name Service resolution, LAN acceleration and an application firewall.

In some embodiments, the appliance 205 provides a SSL VPN connection between a client 102 and a server 106. For example, a client 102 on a first network 104 requests to establish a connection to a server 106 on a second network 104'. In some embodiments, the second network 104" is not routable from the first network 104. In other embodiments, the client 102 is on a public network 104 and the server 106 is on a private network 104', such as a corporate network. In one embodiment, a client agent intercepts communications of the client 102 on the first network 104, encrypts the communications, and transmits the communications via a first transport layer connection to the appliance 205. The appliance 205 associates the first transport layer connection on the first network 104 to a second transport layer connection to the server 106 on the second network 104. The appliance 205 receives the intercepted communication from the client agent, decrypts the communications, and transmits the communication to the server 106 on the second network 104 via the second transport layer connection. The second transport layer connection may be a pooled transport layer connection. In one embodiment, the appliance 205 provides an end-to-end secure transport layer connection for the client 102 between the two networks 104, 104'

In one embodiments, the appliance 205 hosts an intranet internet protocol or intranet IP address of the client 102 on the virtual private network 104. The client 102 has a local network identifier, such as an internet protocol (IP) address and/or host name on the first network 104. When connected to the second network 104' via the appliance 205, the appliance 205 establishes, assigns or otherwise provides an Intranet IP, which is a network identifier, such as IP address and/or host name, for the client 102 on the second network 104'. The appliance 205 listens for and receives on the second or private network 104' for any communications directed towards the client 102 using the client's established Intranet IP. In one embodiment, the appliance 205 acts as or on behalf of the client 102 on the second private network 104.

In some embodiments, the appliance 205 has an encryption engine providing logic, business rules, functions or operations for handling the processing of any security related protocol, such as SSL or TLS, or any function related thereto. For example, the encryption engine encrypts and decrypts network packets, or any portion thereof, communicated via the appliance 205. The encryption engine may also setup or establish SSL or TLS connections on behalf of the client 102a-102n, server 106a-106n, or appliance 200, 205. As such, the encryption engine provides offloading and acceleration of SSL processing. In one embodiment, the encryption engine uses a tunneling protocol to provide a virtual private network between a client 102a-102n and a server 106a-106n. In some embodiments, the encryption engine uses an encryption processor. In other embodiments, the encryption engine includes executable instructions running on an encryption processor.

In some embodiments, the appliance 205 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, 6) caching, and 7) network QOS.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 205 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 205, and the destination network address is changed to that of the intended server. In the case of an outbound packet (that is, one received from a server 106), the source network address is changed from that of the server 106 to that of an output port of appliance 205 and the destination address is changed from that of appliance 205 to that of the requesting client 102. The sequence numbers and acknowledgment numbers of the packet are also translated to sequence numbers and acknowledgement expected by the client 102 on the appliance's 205 transport layer connection to the client 102. In some embodiments, the packet checksum of the transport layer protocol is recalculated to account for these translations.

In another embodiment, the appliance 205 provides switching or load-balancing functionality for communications between the client 102 and server 106. In some embodiments, the appliance 205 distributes traffic and directs client requests to a server 106 based on layer 4 payload or application-layer request data. In one embodiment, although the network layer or layer 2 of the network packet identifies a destination server 106, the appliance 205 determines the server 106 to distribute the network packet by application information and data carried as payload of the transport layer packet. In one embodiment, a health monitoring program of the appliance 205 monitors the health of servers to determine the server 106 for which to distribute a client's request. In some embodiments, if the appliance 205 detects a server 106 is not available or has a load over a predetermined threshold, the appliance 205 can direct or distribute client requests to another server 106.

In some embodiments, the appliance 205 acts as a Domain Name Service (DNS) resolver or otherwise provides resolution of a DNS request from clients 102. In some embodiments, the appliance intercepts' a DNS request transmitted by the client 102. In one embodiment, the appliance 205 responds to a client's DNS request with an IP address of or hosted by the appliance 205. In this embodiment, the client 102 transmits network communication for the domain name to the appliance 200. In another embodiment, the appliance 200 responds to a client's DNS request with an IP address of or hosted by a second appliance 200'. In some embodiments, the appliance 205 responds to a client's DNS request with an IP address of a server 106 determined by the appliance 200.

In yet another embodiment, the appliance 205 provides application firewall functionality for communications between the client 102 and server 106. In one embodiment, a policy engine 295' provides rules for detecting and blocking illegitimate requests. In some embodiments, the application firewall protects against denial of service (DoS) attacks. In other embodiments, the appliance inspects the content of intercepted requests to identify and block application-based attacks. In some embodiments, the rules/policy engine includes one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall of the appliance provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall of the appliance 205 ensures cookies are not modified. In other embodiments, the appliance 205 protects against forceful browsing by enforcing legal URLs.

In still yet other embodiments, the application firewall appliance 205 protects any confidential information contained in the network communication. The appliance 205 may inspect or analyze any network communication in accordance with the rules or polices of the policy engine to identify any confidential information in any field of the network packet. In some embodiments, the application firewall identifies in the network communication one or more occurrences of a credit card number, password, social security number, name, patient code, contact information, and age. The encoded portion of the network communication may include these occurrences or the confidential information. Based on these occurrences, in one embodiment, the application firewall may take a policy action on the network communication, such as prevent transmission of the network communication. In another embodiment, the application firewall may rewrite, remove or otherwise mask such identified occurrence or confidential information.

Although generally referred to as a network optimization or first appliance 200 and a second appliance 205, the first appliance 200 and second appliance 205 may be the same type and form of appliance. In one embodiment, the second appliance 205 may perform the same functionality, or portion thereof, as the first appliance 200, and vice-versa. For example, the first appliance 200 and second appliance 205 may both provide acceleration techniques. In one embodiment, the first appliance may perform LAN acceleration while the second appliance performs WAN acceleration, or vice-versa. In another example, the first appliance 200 may also be a transport control protocol terminating device as with the second appliance 205. Furthermore, although appliances 200 and 205 are shown as separate devices on the network, the appliance 200 and/or 205 could be a part of any client 102 or server 106.

Figure 1D:
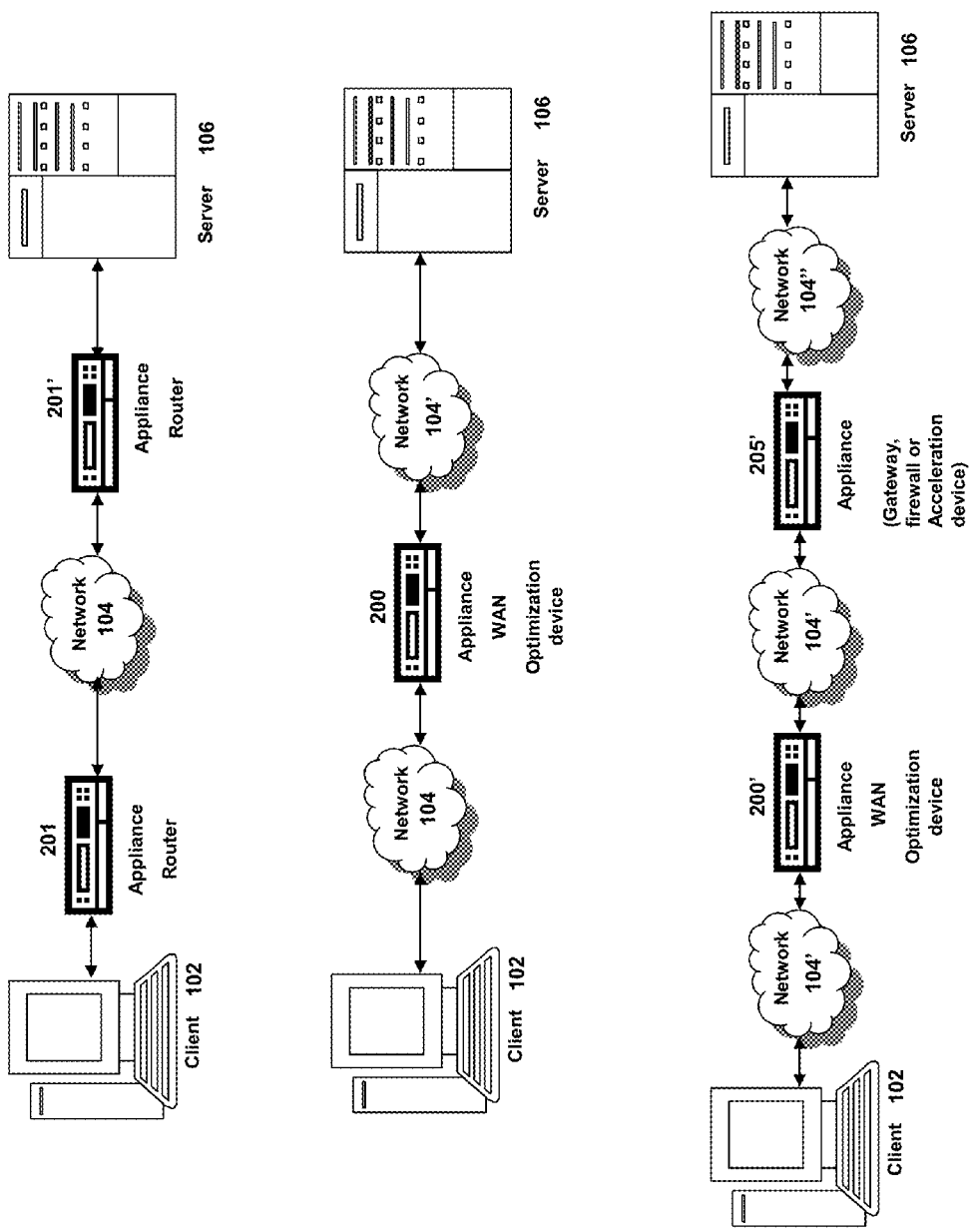
FIG. 1D is a block diagram of multiple embodiments of a network environment for a client to access a server via one or more network optimization appliances, routers, or other intermediary computing devices deployed stand-alone or in conjunction with other network appliances.

Referring now to FIG. 1D, other embodiments of network environments for deploying appliances, routers, or other intermediary computing devices are depicted. In one embodiment depicted on the top of FIG. 1D, one or more routers 201 and 201' may be deployed between a client 102 and server 106. Although shown connected via a single network 104, in many embodiments, multiple networks 104 and 104' and additional appliances or intermediary computing devices may be utilized between client 102 and server 106. In another embodiment as depicted in the middle of FIG. 1D, the appliance 200 may be deployed as a single appliance or single proxy on the network 104. For example, the appliance 200 may be designed, constructed or adapted to perform WAN optimization techniques discussed herein without a second cooperating appliance 200'. In other embodiments as depicted on the bottom of FIG. 1D, a single appliance 200 may be deployed with one or more second appliances 205. For example, a WAN acceleration first appliance 200, such as a Citrix WANScaler appliance, may be deployed with a LAN accelerating or Application Firewall second appliance 205, such as a Citrix NetScaler appliance.

Computing Device

Figure 1E:
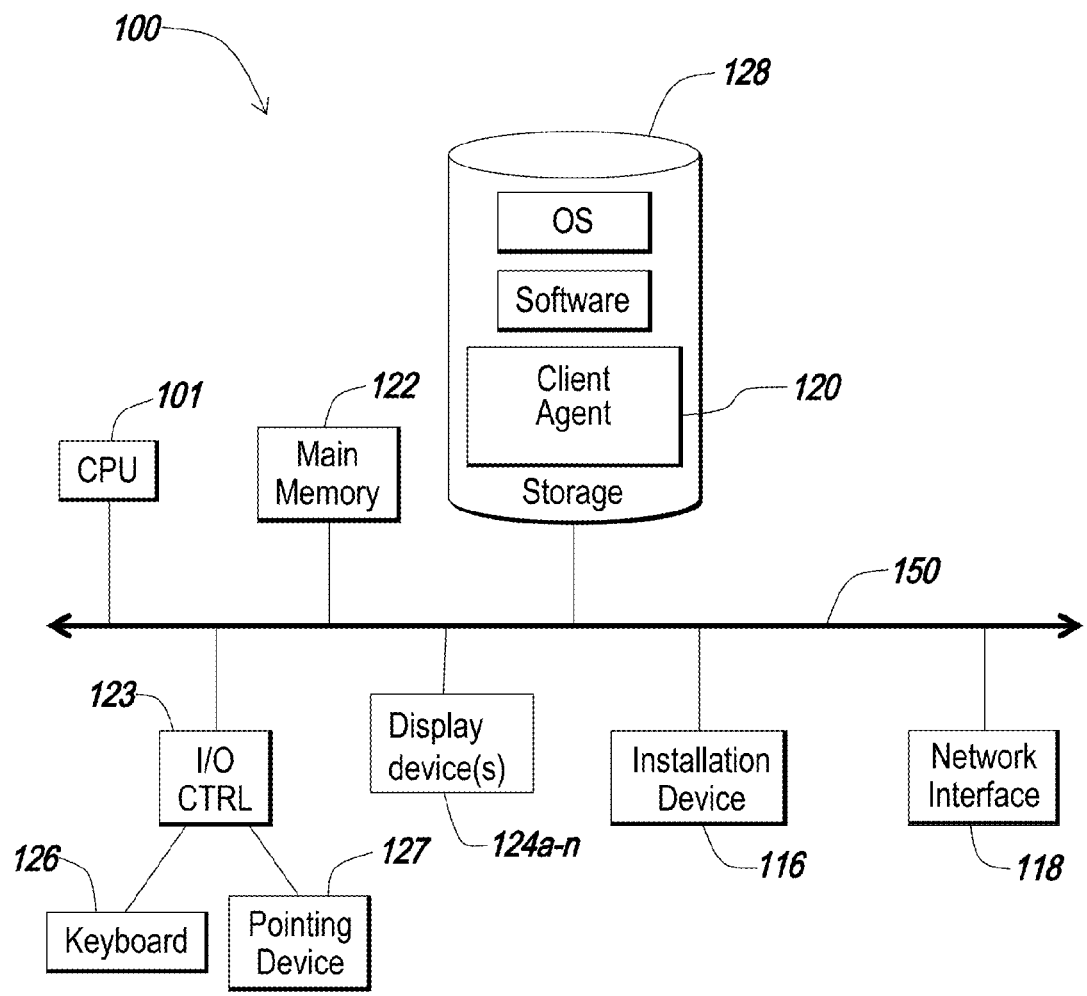
FIGS. 1E and 1F are block diagrams of embodiments of a computing device.
Figure 1F:
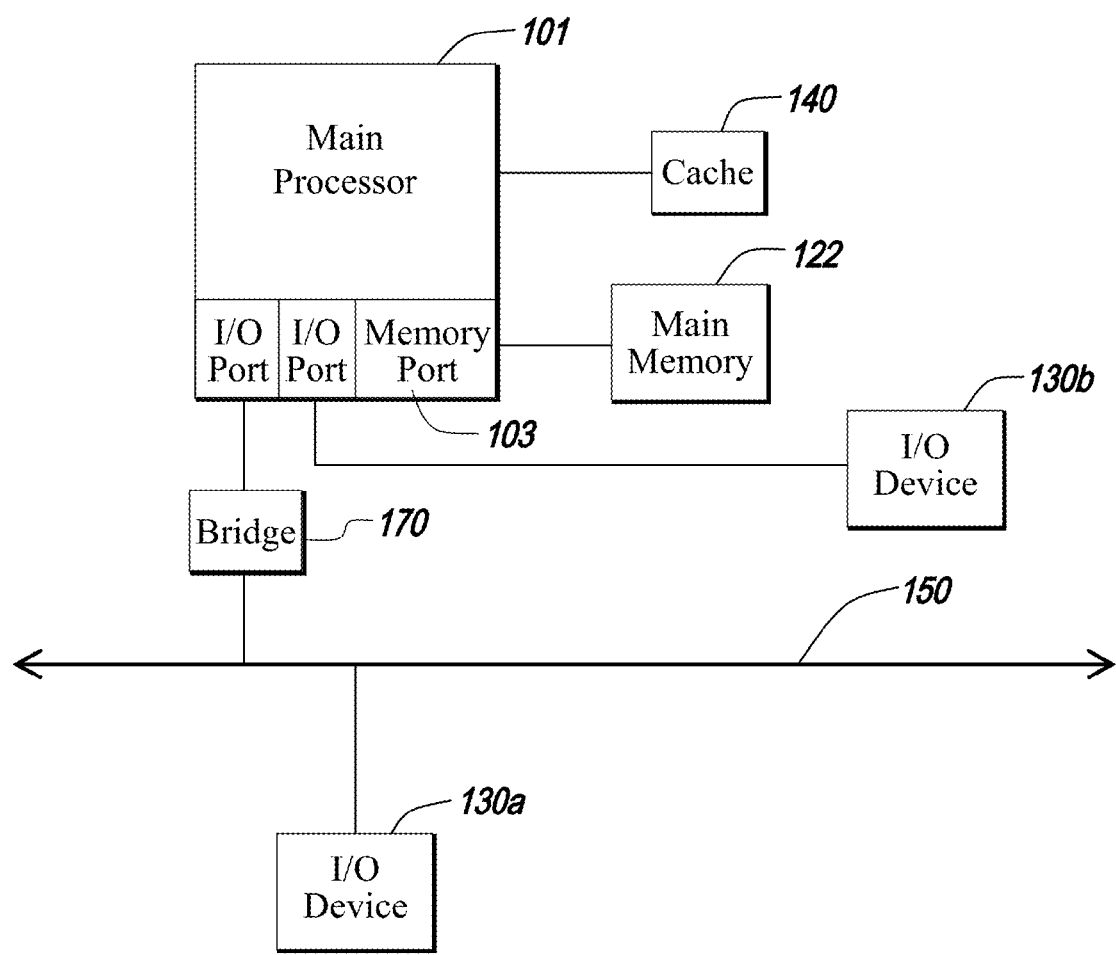

The client 102, server 106, and appliance 200 and 205 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, and WINDOWS 7, all of which are manufactured by Microsoft Corporation of Redmond, Wash.; MacOS manufactured by Apple Computer of Cupertino, Calif.; OS/2, manufactured by International Business Machines of Armonk, N.Y.; various tablet or smart phone operating systems such as iOS, manufactured by Apple Computer, Windows Mobile and Windows Phone, manufactured by Microsoft Corporation, Android, manufactured by Google, Inc. of Mountain View, Calif., BlackBerry OS manufactured by RIM, Ltd., of Ontario, Canada, or webOS, manufactured by Hewlett-Packard Company of Palo Alto, Calif.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is an iPad or iPad 2 tablet computer manufactured by Apple Computer. In this embodiment, the iPad tablet is operated under the control of the iOSoperating system, comprises an A4 or A5 processor, manufactured by Apple Computer, and includes a multi-touch capacitive touch screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. System and Appliance Architecture

Figure 2:
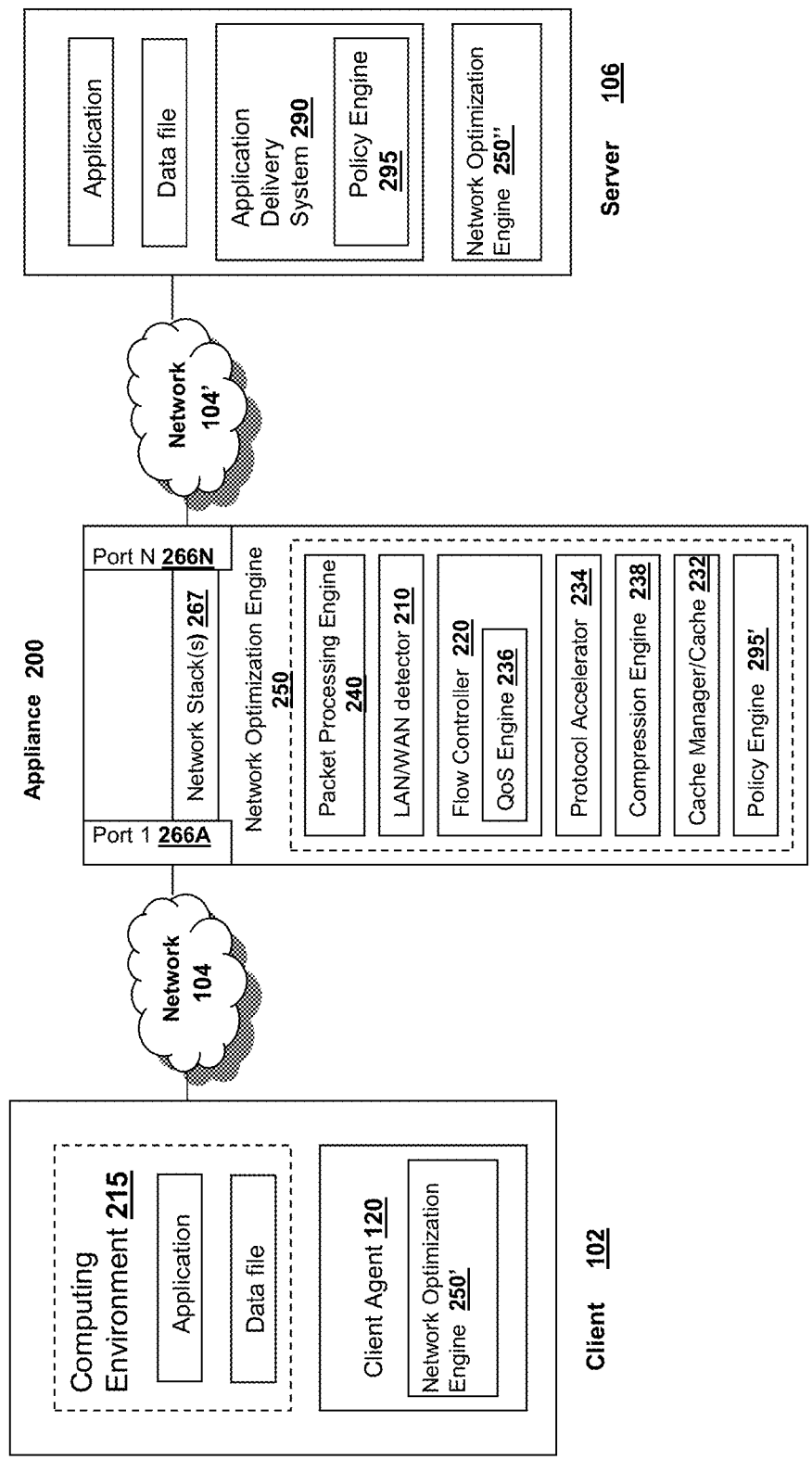
FIG. 2 is a block diagram of an embodiment of an intermediary computing device for processing communications between a client and a server.

Referring now to FIG. 2, an embodiment of a system environment and architecture of an appliance, router, or other intermediary computing device for delivering and/or operating a computing environment on a client is depicted. In some embodiments, a server 106 includes an application delivery system 290 for delivering a computing environment or an application and/or data file to one or more clients 102. In brief overview, a client 102 is in communication with a server 106 via network 104 and appliance 200. For example, the client 102 may reside in a remote office of a company, e.g., a branch office, and the server 106 may reside at a corporate data center. The client 102 has a client agent 120, and a computing environment 215. The computing environment 215 may execute or operate an application that accesses, processes or uses a data file. The computing environment 215, application and/or data file may be delivered via the appliance 200 and/or the server 106.

In some embodiments, the appliance 200 accelerates delivery of a computing environment 215, or any portion thereof, to a client 102. In one embodiment, the appliance 200 accelerates the delivery of the computing environment 215 by the application delivery system 290. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. In another embodiment, the appliance 200 controls, manages, or adjusts the transport layer protocol to accelerate delivery of the computing environment. In some embodiments, the appliance 200 uses caching and/or compression techniques to accelerate delivery of a computing environment.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 200, or a plurality of appliances.

The client 102 may include a computing environment 215 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in computing environment 215 on client 102.

In some embodiments, the application delivery system 290 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 290 may deliver one or more applications to clients 102 or users via a remote-display protocol or otherwise via remote-based or server-based computing. In another embodiment, the application delivery system 290 may deliver one or more applications to clients or users via steaming of the application.

In one embodiment, the application delivery system 290 includes a policy engine 295 for controlling and managing the access to, selection of application execution methods and the delivery of applications. In some embodiments, the policy engine 295 determines the one or more applications a user or client 102 may access. In another embodiment, the policy engine 295 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client or local machine 102 to execute the application program locally after retrieving a plurality of application files comprising the application. In yet another embodiment, the application delivery system 290 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Delivery Center suite by Citrix Systems, Inc., such as XenApp or XenServer, and/or any of the Microsoft® Remote Desktop Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Example Appliance Architecture

FIG. 2 also illustrates an example embodiment of the appliance 200. The architecture of the appliance 200 in FIG. 2 is provided by way of illustration only and is not intended to be limiting in any manner. The appliance 200 may include any type and form of computing device 100, such as any element or portion described in conjunction with FIGS. 1E and 1F above. In brief overview, the appliance 200 has one or more network ports 266A-226N and one or more networks stacks 267A-267N for receiving and/or transmitting communications via networks 104. The appliance 200 also has a network optimization engine 250 for optimizing, accelerating or otherwise improving the performance, operation, or quality of any network traffic or communications traversing the appliance 200.

The appliance 200 includes or is under the control of an operating system. The operating system of the appliance 200 may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The operating system of appliance 200 allocates, manages, or otherwise segregates the available system memory into what is referred to as kernel or system space, and user or application space. The kernel space is typically reserved for running the kernel, including any device drivers, kernel extensions or other kernel related software. As known to those skilled in the art, the kernel is the core of the operating system, and provides access, control, and management of resources and hardware-related elements of the appliance 200. In accordance with an embodiment of the appliance 200, the kernel space also includes a number of network services or processes working in conjunction with the network optimization engine 250, or any portion thereof. Additionally, the embodiment of the kernel will depend on the embodiment of the operating system installed, configured, or otherwise used by the device 200. In contrast to kernel space, user space is the memory area or portion of the operating system used by user mode applications or programs otherwise running in user mode. A user mode application may not access kernel space directly and uses service calls in order to access kernel services. The operating system uses the user or application space for executing or running applications and provisioning of user level programs, services, processes and/or tasks.

The appliance 200 has one or more network ports 266 for transmitting and receiving data over a network 104. The network port 266 provides a physical and/or logical interface between the computing device and a network 104 or another device 100 for transmitting and receiving network communications. The type and form of network port 266 depends on the type and form of network and type of medium for connecting to the network. Furthermore, any software of, provisioned for or used by the network port 266 and network stack 267 may run in either kernel space or user space.

In one embodiment, the appliance 200 has one network stack 267, such as a TCP/IP based stack, for communicating on a network 105, such with the client 102 and/or the server 106. In one embodiment, the network stack 267 is used to communicate with a first network, such as network 104, and also with a second network 104'. In another embodiment, the appliance 200 has two or more network stacks, such as first network stack 267A and a second network stack 267N. The first network stack 267A may be used in conjunction with a first port 266A to communicate on a first network 104. The second network stack 267N may be used in conjunction with a second port 266N to communicate on a second network 104'. In one embodiment, the network stack(s) 267 has one or more buffers for queuing one or more network packets for transmission by the appliance 200.

The network stack 267 includes any type and form of software, or hardware, or any combinations thereof, for providing connectivity to and communications with a network. In one embodiment, the network stack 267 includes a software implementation for a network protocol suite. The network stack 267 may have one or more network layers, such as any networks layers of the Open Systems Interconnection (OSI) communications model as those skilled in the art recognize and appreciate. As such, the network stack 267 may have any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 267 includes a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 267 has any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 267 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 267, such as for voice communications or real-time data communications.

Furthermore, the network stack 267 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 267 may be customized, modified or adapted to provide a custom or modified portion of the network stack 267 in support of any of the techniques described herein.

In one embodiment, the appliance 200 provides for or maintains a transport layer connection between a client 102 and server 106 using a single network stack 267. In some embodiments, the appliance 200 effectively terminates the transport layer connection by changing, managing or controlling the behavior of the transport control protocol connection between the client and the server. In these embodiments, the appliance 200 may use a single network stack 267. In other embodiments, the appliance 200 terminates a first transport layer connection, such as a TCP connection of a client 102, and establishes a second transport layer connection to a server 106 for use by or on behalf of the client 102, e.g., the second transport layer connection is terminated at the appliance 200 and the server 106. The first and second transport layer connections may be established via a single network stack 267. In other embodiments, the appliance 200 may use multiple network stacks, for example 267A and 267N. In these embodiments, the first transport layer connection may be established or terminated at one network stack 267A, and the second transport layer connection may be established or terminated on the second network stack 267N. For example, one network stack may be for receiving and transmitting network packets on a first network, and another network stack for receiving and transmitting network packets on a second network.

As shown in FIG. 2, the network optimization engine 250 includes one or more of the following elements, components or modules: network packet processing engine 240, LAN/WAN detector 210, flow controller 220, QoS engine 236, protocol accelerator 234, compression engine 238, cache manager 232 and policy engine 295'. The network optimization engine 250, or any portion thereof, may include software, hardware or any combination of software and hardware. Furthermore, any software of, provisioned for or used by the network optimization engine 250 may run in either kernel space or user space. For example, in one embodiment, the network optimization engine 250 may run in kernel space. In another embodiment, the network optimization engine 250 may run in user space. In yet another embodiment, a first portion of the network optimization engine 250 runs in kernel space while a second portion of the network optimization engine 250 runs in user space.

Network Packet Processing Engine

The network packet engine 240, also generally referred to as a packet processing engine or packet engine, is responsible for controlling and managing the processing of packets received and transmitted by appliance 200 via network ports 266 and network stack(s) 267. The network packet engine 240 may operate at any layer of the network stack 267. In one embodiment, the network packet engine 240 operates at layer 2 or layer 3 of the network stack 267. In some embodiments, the packet engine 240 intercepts or otherwise receives packets at the network layer, such as the IP layer in a TCP/IP embodiment. In another embodiment, the packet engine 240 operates at layer 4 of the network stack 267. For example, in some embodiments, the packet engine 240 intercepts or otherwise receives packets at the transport layer, such as intercepting packets as the TCP layer in a TCP/IP embodiment. In other embodiments, the packet engine 240 operates at any session or application layer above layer 4. For example, in one embodiment, the packet engine 240 intercepts or otherwise receives network packets above the transport layer protocol layer, such as the payload of a TCP packet in a TCP embodiment.

The packet engine 240 may include a buffer for queuing one or more network packets during processing, such as for receipt of a network packet or transmission of a network packet. Additionally, the packet engine 240 is in communication with one or more network stacks 267 to send and receive network packets via network ports 266. The packet engine 240 may include a packet processing timer. In one embodiment, the packet processing timer provides one or more time intervals to trigger the processing of incoming, i.e., received, or outgoing, i.e., transmitted, network packets. In some embodiments, the packet engine 240 processes network packets responsive to the timer. The packet processing timer provides any type and form of signal to the packet engine 240 to notify, trigger, or communicate a time related event, interval or occurrence. In many embodiments, the packet processing timer operates in the order of milliseconds, such as for example 100 ms, 50 ms, 25 ms, 10 ms, 5 ms or 1 ms.

During operations, the packet engine 240 may be interfaced, integrated or be in communication with any portion of the network optimization engine 250, such as the LAN/WAN detector 210, flow controller 220, QoS engine 236, protocol accelerator 234, compression engine 238, cache manager 232 and/or policy engine 295'. As such, any of the logic, functions, or operations of the LAN/WAN detector 210, flow controller 220, QoS engine 236, protocol accelerator 234, compression engine 238, cache manager 232 and policy engine 295' may be performed responsive to the packet processing timer and/or the packet engine 240. In some embodiments, any of the logic, functions, or operations of the encryption engine 234, cache manager 232, policy engine 236 and multi-protocol compression logic 238 may be performed at the granularity of time intervals provided via the packet processing timer, for example, at a time interval of less than or equal to 10 ms. For example, in one embodiment, the cache manager 232 may perform expiration of any cached objects responsive to the integrated packet engine 240 and/or the packet processing timer 242. In another embodiment, the expiry or invalidation time of a cached object can be set to the same order of granularity as the time interval of the packet processing timer, such as at every 10 ms.

Cache Manager

The cache manager 232 may include software, hardware or any combination of software and hardware to store data, information and objects to a cache in memory or storage, provide cache access, and control and manage the cache. The data, objects or content processed and stored by the cache manager 232 may include data in any format, such as a markup language, or any type of data communicated via any protocol. In some embodiments, the cache manager 232 duplicates original data stored elsewhere or data previously computed, generated or transmitted, in which the original data may require longer access time to fetch, compute or otherwise obtain relative to reading a cache memory or storage element. Once the data is stored in the cache, future use can be made by accessing the cached copy rather than refetching or recomputing the original data, thereby reducing the access time. In some embodiments, the cache may comprise a data object in memory of the appliance 200. In another embodiment, the cache may comprise any type and form of storage element of the appliance 200, such as a portion of a hard disk. In some embodiments, the processing unit of the device may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any caching techniques of the appliance 200. In some embodiments, the cache manager 232 may operate as an application, library, program, service, process, thread or task. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

Policy Engine

The policy engine 295' includes any logic, function or operations for providing and applying one or more policies or rules to the function, operation or configuration of any portion of the appliance 200. The policy engine 295' may include, for example, an intelligent statistical engine or other programmable application(s). In one embodiment, the policy engine 295 provides a configuration mechanism to allow a user to identify, specify, define or configure a policy for the network optimization engine 250, or any portion thereof. For example, the policy engine 295 may provide policies for what data to cache, when to cache the data, for whom to cache the data, when to expire an object in cache or refresh the cache. In other embodiments, the policy engine 236 may include any logic, rules, functions or operations to determine and provide access, control and management of objects, data or content being cached by the appliance 200 in addition to access, control and management of security, network traffic, network access, network QOS, compression or any other function or operation performed by the appliance 200.

In some embodiments, the policy engine 295' provides and applies one or more policies based on any one or more of the following: a user, identification of the client, identification of the server, the type of connection, the time of the connection, the type of network, or the contents of the network traffic. In one embodiment, the policy engine 295' provides and applies a policy based on any field or header at any protocol layer of a network packet. In another embodiment, the policy engine 295' provides and applies a policy based on any payload of a network packet. For example, in one embodiment, the policy engine 295' applies a policy based on identifying a certain portion of content of an application layer protocol carried as a payload of a transport layer packet. In another example, the policy engine 295' applies a policy based on any information identified by a client, server or user certificate. In yet another embodiment, the policy engine 295' applies a policy based on any attributes or characteristics obtained about a client 102, such as via any type and form of endpoint detection (see for example the collection agent of the client agent discussed below).

In one embodiment, the policy engine 295' works in conjunction or cooperation with the policy engine 295 of the application delivery system 290. In some embodiments, the policy engine 295' is a distributed portion of the policy engine 295 of the application delivery system 290. In another embodiment, the policy engine 295 of the application delivery system 290 is deployed on or executed on the appliance 200. In some embodiments, the policy engines 295, 295' both operate on the appliance 200. In yet another embodiment, the policy engine 295', or a portion thereof, of the appliance 200 operates on a server 106.

Multi-Protocol and Multi-Layer Compression Engine

The compression engine 238 includes any logic, business rules, function or operations for compressing one or more protocols of a network packet, such as any of the protocols used by the network stack 267 of the appliance 200. The compression engine 238 may also be referred to as a multi-protocol compression engine 238 in that it may be designed, constructed or capable of compressing a plurality of protocols. In one embodiment, the compression engine 238 applies context insensitive compression, which is compression applied to data without knowledge of the type of data. In another embodiment, the compression engine 238 applies context-sensitive compression. In this embodiment, the compression engine 238 utilizes knowledge of the data type to select a specific compression algorithm from a suite of suitable algorithms. In some embodiments, knowledge of the specific protocol is used to perform context-sensitive compression. In one embodiment, the appliance 200 or compression engine 238 can use port numbers (e.g., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data.

In one embodiment, the compression engine 238 uses a delta-type compression algorithm. In another embodiment, the compression engine 238 uses first site compression as well as searching for repeated patterns among data stored in cache, memory or disk. In some embodiments, the compression engine 238 uses a lossless compression algorithm. In other embodiments, the compression engine uses a lossy compression algorithm. In some cases, knowledge of the data type and, sometimes, permission from the user are required to use a lossy compression algorithm. Compression is not limited to the protocol payload. The control fields of the protocol itself may be compressed. In some embodiments, the compression engine 238 uses a different algorithm than that used for the payload.

In some embodiments, the compression engine 238 compresses at one or more layers of the network stack 267. In one embodiment, the compression engine 238 compresses at a transport layer protocol. In another embodiment, the compression engine 238 compresses at an application layer protocol. In some embodiments, the compression engine 238 compresses at a layer 2-4 protocol. In other embodiments, the compression engine 238 compresses at a layer 5-7 protocol. In yet another embodiment, the compression engine compresses a transport layer protocol and an application layer protocol. In some embodiments, the compression engine 238 compresses a layer 2-4 protocol and a layer 5-7 protocol.

In some embodiments, the compression engine 238 uses memory-based compression, cache-based compression or disk-based compression or any combination thereof. As such, the compression engine 238 may be referred to as a multi-layer compression engine. In one embodiment, the compression engine 238 uses a history of data stored in memory, such as RAM. In another embodiment, the compression engine 238 uses a history of data stored in a cache, such as L2 cache of the processor. In other embodiments, the compression engine 238 uses a history of data stored to a disk or storage location. In some embodiments, the compression engine 238 uses a hierarchy of cache-based, memory-based and disk-based data history. The compression engine 238 may first use the cache-based data to determine one or more data matches for compression, and then may check the memory-based data to determine one or more data matches for compression. In another case, the compression engine 238 may check disk storage for data matches for compression after checking either the cache-based and/or memory-based data history.

In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine by integrating with packet processing engine 240 accessing the network stack 267 is able to compress any of the protocols carried by a transport layer protocol, such as any application layer protocol.

LAN/WAN Detector

The LAN/WAN detector 238 includes any logic, business rules, function or operations for automatically detecting a slow side connection (e.g., a wide area network (WAN) connection such as an Intranet) and associated port 267, and a fast side connection (e.g., a local area network (LAN) connection) and an associated port 267. In some embodiments, the LAN/WAN detector 238 monitors network traffic on the network ports 267 of the appliance 200 to detect a synchronization packet, sometimes referred to as a "tagged" network packet. The synchronization packet identifies a type or speed of the network traffic. In one embodiment, the synchronization packet identifies a WAN speed or WAN type connection. The LAN/WAN detector 238 also identifies receipt of an acknowledgement packet to a tagged synchronization packet and on which port it is received. The appliance 200 then configures itself to operate the identified port on which the tagged synchronization packet arrived so that the speed on that port is set to be the speed associated with the network connected to that port. The other port is then set to the speed associated with the network connected to that port.

For ease of discussion herein, reference to "fast" side will be made with respect to connection with a wide area network (WAN), e.g., the Internet, and operating at a network speed of the WAN. Likewise, reference to "slow" side will be made with respect to connection with a local area network (LAN) and operating at a network speed the LAN. However, it is noted that "fast" and "slow" sides in a network can change on a per-connection basis and are relative terms to the speed of the network connections or to the type of network topology. Such configurations are useful in complex network topologies, where a network is "fast" or "slow" only when compared to adjacent networks and not in any absolute sense.

In one embodiment, the LAN/WAN detector 238 may be used to allow for auto-discovery by an appliance 200 of a network to which it connects. In another embodiment, the LAN/WAN detector 238 may be used to detect the existence or presence of a second appliance 200' deployed in the network 104. For example, an auto-discovery mechanism in operation in accordance with FIG. 1A functions as follows: appliance 200 and 200' are placed in line with the connection linking client 102 and server 106. The appliances 200 and 200' are at the ends of a low-speed link, e.g., Internet, connecting two LANs. In one example embodiment, appliances 200 and 200' each include two ports—one to connect with the "lower" speed link and the other to connect with a "higher" speed link, e.g., a LAN. Any packet arriving at one port is copied to the other port. Thus, appliance 200 and 200' are each configured to function as a bridge between the two networks 104.

When an end node, such as the client 102, opens a new TCP connection with another end node, such as the server 106, the client 102 sends a TCP packet with a synchronization (SYN) header bit set, or a SYN packet, to the server 106. In the present example, client 102 opens a transport layer connection to server 106. When the SYN packet passes through appliance 200, the appliance 200 inserts, attaches or otherwise provides a characteristic TCP header option to the packet, which announces its presence. If the packet passes through a second appliance, in this example appliance 200' the second appliance notes the header option on the SYN packet. The server 106 responds to the SYN packet with a synchronization acknowledgment (SYN-ACK) packet. When the SYN-ACK packet passes through appliance 200', a TCP header option is tagged (e.g., attached, inserted or added) to the SYN-ACK packet to announce appliance 200' presence to appliance 200. When appliance 200 receives this packet, both appliances 200, 200' are now aware of each other and the connection can be appropriately accelerated.

Further to the operations of the LAN/WAN detector 238, a method or process for detecting "fast" and "slow" sides of a network using a SYN packet is described. During a transport layer connection establishment between a client 102 and a server 106, the appliance 200 via the LAN/WAN detector 238 determines whether the SYN packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configure the port receiving the untagged packet as the "fast" side. The appliance 200 then tags the SYN packet with an ACK and copies the packet to the other port.

In another embodiment, the LAN/WAN detector 238 detects fast and slow sides of a network using a SYN-ACK packet. The appliance 200 via the LAN/WAN detector 238 determines whether the SYN-ACK packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The LAN/WAN detector 238 determines whether the SYN packet was tagged. If the SYN packet was not tagged, the appliance 200 copied the packet to the other port. If the SYN packet was tagged, the appliance tags the SYN-ACK packet before copying it to the other port.

The appliance 200, 200' may add, insert, modify, attach or otherwise provide any information or data in the TCP option header to provide any information, data or characteristics about the network connection, network traffic flow, or the configuration or operation of the appliance 200. In this manner, not only does an appliance 200 announce its presence to another appliance 200' or tag a higher or lower speed connection, the appliance 200 provides additional information and data via the TCP option headers about the appliance or the connection. The TCP option header information may be useful to or used by an appliance in controlling, managing, optimizing, acceleration or improving the network traffic flow traversing the appliance 200, or to otherwise configure itself or operation of a network port.

Although generally described in conjunction with detecting speeds of network connections or the presence of appliances, the LAN/WAN detector 238 can be used for applying any type of function, logic or operation of the appliance 200 to a port, connection or flow of network traffic. In particular, automated assignment of ports can occur whenever a device performs different functions on different ports, where the assignment of a port to a task can be made during the unit's operation, and/or the nature of the network segment on each port is discoverable by the appliance 200.

Flow Control

The flow controller 220 includes any logic, business rules, function or operations for optimizing, accelerating or otherwise improving the performance, operation or quality of service of transport layer communications of network packets or the delivery of packets at the transport layer. A flow controller, also sometimes referred to as a flow control module, regulates, manages and controls data transfer rates. In some embodiments, the flow controller 220 is deployed at or connected at a bandwidth bottleneck in the network 104. In one embodiment, the flow controller 220 effectively regulates, manages and controls bandwidth usage or utilization. In other embodiments, the flow control modules may also be deployed at points on the network of latency transitions (low latency to high latency) and on links with media losses (such as wireless or satellite links).

In some embodiments, a flow controller 220 may include a receiver-side flow control module for controlling the rate of receipt of network transmissions and a sender-side flow control module for the controlling the rate of transmissions of network packets. In other embodiments, a first flow controller 220 includes a receiver-side flow control module and a second flow controller 220' includes a sender-side flow control module. In some embodiments, a first flow controller 220 is deployed on a first appliance 200 and a second flow controller 220' is deployed on a second appliance 200'. As such, in some embodiments, a first appliance 200 controls the flow of data on the receiver side and a second appliance 200' controls the data flow from the sender side. In yet another embodiment, a single appliance 200 includes flow control for both the receiver-side and sender-side of network communications traversing the appliance 200.

In one embodiment, a flow control module 220 is configured to allow bandwidth at the bottleneck to be more fully utilized, and in some embodiments, not over utilized. In some embodiments, the flow control module 220 transparently buffers (or rebuffers data already buffered by, for example, the sender) network sessions that pass between nodes having associated flow control modules 220. When a session passes through two or more flow control modules 220, one or more of the flow control modules controls a rate of the session(s).

In one embodiment, the flow control module 200 is configured with predetermined data relating to bottleneck bandwidth. In another embodiment, the flow control module 220 may be configured to detect the bottleneck bandwidth or data associated therewith. Unlike conventional network protocols such as TCP, a receiver-side flow control module 220 controls the data transmission rate. The receiver-side flow control module controls 220 the sender-side flow control module, e.g., 220, data transmission rate by forwarding transmission rate limits to the sender-side flow control module 220. In one embodiment, the receiver-side flow control module 220 piggybacks these transmission rate limits on acknowledgement (ACK) packets (or signals) sent to the sender, e.g., client 102, by the receiver, e.g., server 106. The receiver-side flow control module 220 does this in response to rate control requests that are sent by the sender side flow control module 220'. The requests from the sender-side flow control module 220' may be "piggybacked" on data packets sent by the sender 106.

In some embodiments, the flow controller 220 manipulates, adjusts, simulates, changes, improves or otherwise adapts the behavior of the transport layer protocol to provide improved performance or operations of delivery, data rates and/or bandwidth utilization of the transport layer. The flow controller 220 may implement a plurality of data flow control techniques at the transport layer, including but not limited to 1) pre-acknowledgements, 2) window virtualization, 3) recongestion techniques, 3) local retransmission techniques, 4) wavefront detection and disambiguation, 5) transport control protocol selective acknowledgements, 6) transaction boundary detection techniques and 7) repacketization.

Although a sender may be generally described herein as a client 102 and a receiver as a server 106, a sender may be any end point such as a server 106 or any computing device 100 on the network 104. Likewise, a receiver may be a client 102 or any other computing device on the network 104.

Pre-Acknowledgements

In brief overview of a pre-acknowledgement flow control technique, the flow controller 220, in some embodiments, handles the acknowledgements and retransmits for a sender, effectively terminating the sender's connection with the downstream portion of a network connection. In reference to FIG. 1B, one possible deployment of an appliance 200 into a network architecture to implement this feature is depicted. In this example environment, a sending computer or client 102 transmits data on network 104, for example, via a switch, which determines that the data is destined for VPN appliance 205. Because of the chosen network topology, all data destined for VPN appliance 205 traverses appliance 200, so the appliance 200 can apply any necessary algorithms to this data.

Continuing further with the example, the client 102 transmits a packet, which is received by the appliance 200. When the appliance 200 receives the packet, which is transmitted from the client 102 to a recipient via the VPN appliance 205 the appliance 200 retains a copy of the packet and forwards the packet downstream to the VPN appliance 205. The appliance 200 then generates an acknowledgement packet (ACK) and sends the ACK packet back to the client 102 or sending endpoint. This ACK, a pre-acknowledgment, causes the sender 102 to believe that the packet has been delivered successfully, freeing the sender's resources for subsequent processing. The appliance 200 retains the copy of the packet data in the event that a retransmission of the packet is required, so that the sender 102 does not have to handle retransmissions of the data. This early generation of acknowledgements may be called "preacking."

If a retransmission of the packet is required, the appliance 200 retransmits the packet to the sender. The appliance 200 may determine whether retransmission is required as a sender would in a traditional system, for example, determining that a packet is lost if an acknowledgement has not been received for the packet after a predetermined amount of time. To this end, the appliance 200 monitors acknowledgements generated by the receiving endpoint, e.g., server 106 (or any other downstream network entity) so that it can determine whether the packet has been successfully delivered or needs to be retransmitted. If the appliance 200 determines that the packet has been successfully delivered, the appliance 200 is free to discard the saved packet data. The appliance 200 may also inhibit forwarding acknowledgements for packets that have already been received by the sending endpoint.

In the embodiment described above, the appliance 200 via the flow controller 220 controls the sender 102 through the delivery of pre-acknowledgements, also referred to as "preacks", as though the appliance 200 was a receiving endpoint itself. Since the appliance 200 is not an endpoint and does not actually consume the data, the appliance 200 includes a mechanism for providing overflow control to the sending endpoint. Without overflow control, the appliance 200 could run out of memory because the appliance 200 stores packets that have been preacked to the sending endpoint but not yet acknowledged as received by the receiving endpoint. Therefore, in a situation in which the sender 102 transmits packets to the appliance 200 faster than the appliance 200 can forward the packets downstream, the memory available in the appliance 200 to store unacknowledged packet data can quickly fill. A mechanism for overflow control allows the appliance 200 to control transmission of the packets from the sender 102 to avoid this problem.

In one embodiment, the appliance 200 or flow controller 220 includes an inherent "self-clocking" overflow control mechanism. This self-clocking is due to the order in which the appliance 200 may be designed to transmit packets downstream and send ACKs to the sender 102 or 106. In some embodiments, the appliance 200 does not preack the packet until after it transmits the packet downstream. In this way, the sender 102 will receive the ACKs at the rate at which the appliance 200 is able to transmit packets rather than the rate at which the appliance 200 receives packets from the sender 100. This helps to regulate the transmission of packets from a sender 102.

Window Virtualization

Another overflow control mechanism that the appliance 200 may implement is to use the TCP window size parameter, which tells a sender how much buffer the receiver is permitting the sender to fill up. A nonzero window size (e.g., a size of at least one Maximum Segment Size (MSS)) in a preack permits the sending endpoint to continue to deliver data to the appliance, whereas a zero window size inhibits further data transmission. Accordingly, the appliance 200 may regulate the flow of packets from the sender, for example when the appliance's 200 buffer is becoming full, by appropriately setting the TCP window size in each preack.

Another technique to reduce this additional overhead is to apply hysteresis. When the appliance 200 delivers data to the slower side, the overflow control mechanism in the appliance 200 can require that a minimum amount of space be available before sending a nonzero window advertisement to the sender. In one embodiment, the appliance 200 waits until there is a minimum of a predetermined number of packets, such as four packets, of space available before sending a nonzero window packet, such as a window size of four packet). This reduces the overhead by approximately a factor four, since only two ACK packets are sent for each group of four data packets, instead of eight ACK packets for four data packets.

Another technique the appliance 200 or flow controller 220 may use for overflow control is the TCP delayed ACK mechanism, which skips ACKs to reduce network traffic. The TCP delayed ACKs automatically delay the sending of an ACK, either until two packets are received or until a fixed timeout has occurred. This mechanism alone can result in cutting the overhead in half; moreover, by increasing the numbers of packets above two, additional overhead reduction is realized. But merely delaying the ACK itself may be insufficient to control overflow, and the appliance 200 may also use the advertised window mechanism on the ACKs to control the sender. When doing this, the appliance 200 in one embodiment avoids triggering the timeout mechanism of the sender by delaying the ACK too long.

In one embodiment, the flow controller 220 does not preack the last packet of a group of packets. By not preacking the last packet, or at least one of the packets in the group, the appliance avoids a false acknowledgement for a group of packets. For example, if the appliance were to send a preack for a last packet and the packet were subsequently lost, the sender would have been tricked into thinking that the packet is delivered when it was not. Thinking that the packet had been delivered, the sender could discard that data. If the appliance also lost the packet, there would be no way to retransmit the packet to the recipient. By not preacking the last packet of a group of packets, the sender will not discard the packet until it has been delivered.

In another embodiment, the flow controller 220 may use a window virtualization technique to control the rate of flow or bandwidth utilization of a network connection. Though it may not immediately be apparent from examining conventional literature such as RFC 1323, there is effectively a send window for transport layer protocols such as TCP. The send window is similar to the receive window, in that it consumes buffer space (though on the sender). The sender's send window consists of all data sent by the application that has not been acknowledged by the receiver. This data must be retained in memory in case retransmission is required. Since memory is a shared resource, some TCP stack implementations limit the size of this data. When the send window is full, an attempt by an application program to send more data results in blocking the application program until space is available. Subsequent reception of acknowledgements will free send-window memory and unblock the application program. In some embodiments, this window size is known as the socket buffer size in some TCP implementations.

In one embodiment, the flow control module 220 is configured to provide access to increased window (or buffer) sizes. This configuration may also be referenced to as window virtualization. In the embodiment of TCP as the transport layer protocol, the TCP header includes a bit string corresponding to a window scale. In one embodiment, "window" may be referenced in a context of send, receive, or both.

One embodiment of window virtualization is to insert a preacking appliance 200 into a TCP session. In reference to any of the environments of FIG. 1A or 1B, initiation of a data communication session between a source node, e.g., client 102 (for ease of discussion, now referenced as source node 102), and a destination node, e.g., server 106 (for ease of discussion, now referenced as destination node 106) is established. For TCP communications, the source node 102 initially transmits a synchronization signal ("SYN") through its local area network 104 to first flow control module 220. The first flow control module 220 inserts a configuration identifier into the TCP header options area. The configuration identifier identifies this point in the data path as a flow control module.

The appliances 200 via a flow control module 220 provide window (or buffer) to allow increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

In one embodiment of scaling using the window virtualization technique, during connection establishment (i.e., initialization of a session) when the first flow control module 220 receives from the source node 102 the SYN signal (or packet), the flow control module 220 stores the windows scale of the source node 102 (which is the previous node) or stores a 0 for window scale if the scale of the previous node is missing. The first flow control module 220 also modifies the scale, e.g., increases the scale to 4 from 0 or 1, in the SYN-FCM signal. When the second flow control module 220 receives the SYN signal, it stores the increased scale from the first flow control signal and resets the scale in the SYN signal back to the source node 103 scale value for transmission to the destination node 106. When the second flow controller 220 receives the SYN-ACK signal from the destination node 106, it stores the scale from the destination node 106 scale, e.g., 0 or 1, and modifies it to an increased scale that is sent with the SYN-ACK-FCM signal. The first flow control node 220 receives and notes the received window scale and revises the windows scale sent back to the source node 102 back down to the original scale, e.g., 0 or 1. Based on the above window shift conversation during connection establishment, the window field in every subsequent packet, e.g., TCP packet, of the session must be shifted according to the window shift conversion.

The window scale, as described above, expresses buffer sizes of over 64 k and may not be required for window virtualization. Thus, shifts for window scale may be used to express increased buffer capacity in each flow control module 220. This increase in buffer capacity in may be referenced as window (or buffer) virtualization. The increase in buffer size allows greater packet through put from and to the respective end nodes 102 and 106. Note that buffer sizes in TCP are typically expressed in terms of bytes, but for ease of discussion "packets" may be used in the description herein as it relates to virtualization.

By way of example, a window (or buffer) virtualization performed by the flow controller 220 is described. In this example, the source node 102 and the destination node 106 are configured similar to conventional end nodes having a limited buffer capacity of 16 k bytes, which equals approximately 10 packets of data. Typically, an end node 102, 106 must wait until the packet is transmitted and confirmation is received before a next group of packets can be transmitted. In one embodiment, using increased buffer capacity in the flow control modules 220, when the source node 103 transmits its data packets, the first flow control module 220 receives the packets, stores it in its larger capacity buffer, e.g., 512 packet capacity, and immediately sends back an acknowledgement signal indicating receipt of the packets ("REC-ACK") back to the source node 102. The source node 102 can then "flush" its current buffer, load it with 10 new data packets, and transmit those onto the first flow control module 220. Again, the first flow control module 220 transmits a REC-ACK signal back to the source node 102 and the source node 102 flushes its buffer and loads it with 10 more new packets for transmission.

As the first flow control module 220 receives the data packets from the source nodes, it loads up its buffer accordingly. When it is ready the first flow control module 220 can begin transmitting the data packets to the second flow control module 230, which also has an increased buffer size, for example, to receive 512 packets. The second flow control module 220' receives the data packets and begins to transmit 10 packets at a time to the destination node 106. Each REC-ACK received at the second flow control node 220 from the destination node 106 results in 10 more packets being transmitted to the destination node 106 until all the data packets are transferred. Hence, the present invention is able to increase data transmission throughput between the source node (sender) 102 and the destination node (receiver) 106 by taking advantage of the larger buffer in the flow control modules 220, 220' between the devices.

It is noted that by "preacking" the transmission of data as described previously, a sender (or source node 102) is allowed to transmit more data than is possible without the preacks, thus affecting a larger window size. For example, in one embodiment this technique is effective when the flow control module 220, 220' is located "near" a node (e.g., source node 102 or destination node 106) that lacks large windows.

Recongestion

Another technique or algorithm of the flow controller 220 is referred to as recongestion. The standard TCP congestion avoidance algorithms are known to perform poorly in the face of certain network conditions, including: large RTTs (round trip times), high packet loss rates, and others. When the appliance 200 detects a congestion condition such as long round trip times or high packet loss, the appliance 200 intervenes, substituting an alternate congestion avoidance algorithm that better suits the particular network condition. In one embodiment, the recongestion algorithm uses preacks to effectively terminate the connection between the sender and the receiver. The appliance 200 then resends the packets from itself to the receiver, using a different congestion avoidance algorithm. Recongestion algorithms may be dependent on the characteristics of the TCP connection. The appliance 200 monitors each TCP connection, characterizing it with respect to the different dimensions, selecting a recongestion algorithm that is appropriate for the current characterization.

In one embodiment, upon detecting a TCP connection that is limited by round trip times (RTT), a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth. One method of establishing "N" relies on the appliance 200 monitoring the packet loss rate, RTT, and packet size of the actual connection. These numbers are plugged into a TCP response curve formula to provide an upper limit on the performance of a single TCP connection in the present configuration. If each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself. Furthermore, each individual connection retains TCP compliance.

Another method of establishing "N" is to utilize a parallel flow control algorithm such as the TCP "Vegas" algorithm or its improved version "Stabilized Vegas." In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In another embodiment, the individual connections within a parallel bundle are virtualized, i.e., actual individual TCP connections are not established. Instead the congestion avoidance algorithm is modified to behave as though there were N parallel connections. This method has the advantage of appearing to transiting network nodes as a single connection. Thus the QOS, security and other monitoring methods of these nodes are unaffected by the recongestion algorithm. In yet another embodiment, the individual connections within a parallel bundle are real, i.e., a separate. TCP connection is established for each of the parallel connections within a bundle. The congestion avoidance algorithm for each TCP connection need not be modified.

Retransmission

In some embodiments, the flow controller 220 may apply a local retransmission technique. One reason for implementing preacks is to prepare to transit a high-loss link (e.g., wireless). In these embodiments, the preacking appliance 200 or flow control module 220 is located most beneficially "before" the wireless link. This allows retransmissions to be performed closer to the high loss link, removing the retransmission burden from the remainder of the network. The appliance 200 may provide local retransmission, in which case, packets dropped due to failures of the link are retransmitted directly by the appliance 200. This is advantageous because it eliminates the retransmission burden upon an end node, such as server 106, and infrastructure of any of the networks 104. With appliance 200 providing local retransmissions, the dropped packet can be retransmitted across the high loss link without necessitating a retransmit by an end node and a corresponding decrease in the rate of data transmission from the end node.

Another reason for implementing preacks is to avoid a receive time out (RTO) penalty. In standard TCP there are many situations that result in an RTO, even though a large percentage of the packets in flight were successfully received. With standard TCP algorithms, dropping more than one packet within an RTT window would likely result in a timeout. Additionally, most TCP connections experience a timeout if a retransmitted packet is dropped. In a network with a high bandwidth delay product, even a relatively small packet loss rate will cause frequent Retransmission timeouts (RTOs). In one embodiment, the appliance 200 uses a retransmit and timeout algorithm is avoid premature RTOs. The appliance 200 or flow controller 220 maintains a count of retransmissions is maintained on a per-packet basis. Each time that a packet is retransmitted, the count is incremented by one and the appliance 200 continues to transmit packets. In some embodiments, only if a packet has been retransmitted a predetermined number of times is an RTO declared.

Wavefront Detection and Disambiguation

In some embodiments, the appliance 200 or flow controller 220 uses wavefront detection and disambiguation techniques in managing and controlling flow of network traffic. In this technique, the flow controller 220 uses transmit identifiers or numbers to determine whether particular data packets need to be retransmitted. By way of example, a sender transmits data packets over a network, where each instance of a transmitted data packet is associated with a transmit number. It can be appreciated that the transmit number for a packet is not the same as the packet's sequence number, since a sequence number references the data in the packet while the transmit number references an instance of a transmission of that data. The transmit number can be any information usable for this purpose, including a timestamp associated with a packet or simply an increasing number (similar to a sequence number or a packet number). Because a data segment may be retransmitted, different transmit numbers may be associated with a particular sequence number.

As the sender transmits data packets, the sender maintains a data structure of acknowledged instances of data packet transmissions. Each instance of a data packet transmission is referenced by its sequence number and transmit number. By maintaining a transmit number for each packet, the sender retains the ordering of the transmission of data packets. When the sender receives an ACK or a SACK, the sender determines the highest transmit number associated with packets that the receiver indicated has arrived (in the received acknowledgement). Any outstanding unacknowledged packets with lower transmit numbers are presumed lost.

In some embodiments, the sender is presented with an ambiguous situation when the arriving packet has been retransmitted: a standard ACK/SACK does not contain enough information to allow the sender to determine which transmission of the arriving packet has triggered the acknowledgement. After receiving an ambiguous acknowledgement, therefore, the sender disambiguates the acknowledgement to associate it with a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets. This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. For example, if an acknowledgement for data packet 1 is received and the last received acknowledgement was for data packet 5, the sender resolves the ambiguity by assuming that the third instance of data packet 1 caused the acknowledgement.

Selective Acknowledgements

Another technique of the appliance 200 or flow controller 220 is to implement an embodiment of transport control protocol selective acknowledgements, or TCP SACK, to determine what packets have or have not been received. This technique allows the sender to determine unambiguously a list of packets that have been received by the receiver as well as an accurate list of packets not received. This functionality may be implemented by modifying the sender and/or receiver, or by inserting sender- and receiver-side flow control modules 220 in the network path between the sender and receiver. In reference to FIG. 1A or FIG. 1B, a sender, e.g., client 102, is configured to transmit data packets to the receiver, e.g., server 106, over the network 104. In response, the receiver returns a TCP Selective Acknowledgment option, referred to as SACK packet to the sender. In one embodiment, the communication is bi-directional, although only one direction of communication is discussed here for simplicity. The receiver maintains a list, or other suitable data structure, that contains a group of ranges of sequence numbers for data packets that the receiver has actually received. In some embodiments, the list is sorted by sequence number in an ascending or descending order. The receiver also maintains a left-off pointer, which comprises a reference into the list and indicates the left-off point from the previously generated SACK packet.

Upon reception of a data packet, the receiver generates and transmits a SACK packet back to the sender. In some embodiments, the SACK packet includes a number of fields, each of which can hold a range of sequence numbers to indicate a set of received data packets. The receiver fills this first field of the SACK packet with a range of sequence numbers that includes the landing packet that triggered the SACK packet. The remaining available SACK fields are filled with ranges of sequence numbers from the list of received packets. As there are more ranges in the list than can be loaded into the SACK packet, the receiver uses the left-off pointer to determine which ranges are loaded into the SACK packet. The receiver inserts the SACK ranges consecutively from the sorted list, starting from the range referenced by the pointer and continuing down the list until the available SACK range space in the TCP header of the SACK packet is consumed. The receiver wraps around to the start of the list if it reaches the end. In some embodiments, two or three additional SACK ranges can be added to the SACK range information.

Once the receiver generates the SACK packet, the receiver sends the acknowledgement back to the sender. The receiver then advances the left-off pointer by one or more SACK range entries in the list. If the receiver inserts four SACK ranges, for example, the left-off pointer may be advanced two SACK ranges in the list. When the advanced left-off pointer reaches at the end of the list, the pointer is reset to the start of the list, effectively wrapping around the list of known received ranges. Wrapping around the list enables the system to perform well, even in the presence of large losses of SACK packets, since the SACK information that is not communicated due to a lost SACK packet will eventually be communicated once the list is wrapped around.

It can be appreciated, therefore, that a SACK packet may communicate several details about the condition of the receiver. First, the SACK packet indicates that, upon generation of the SACK packet, the receiver had just received a data packet that is within the first field of the SACK information. Secondly, the second and subsequent fields of the SACK information indicate that the receiver has received the data packets within those ranges. The SACK information also implies that the receiver had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver may indicate to the sender a range of data packets that have not yet been received by the receiver.

In another embodiment, the sender uses the SACK packet described above in combination with the retransmit technique described above to make assumptions about which data packets have been delivered to the receiver. For example, when the retransmit algorithm (using the transmit numbers) declares a packet lost, the sender considers the packet to be only conditionally lost, as it is possible that the SACK packet identifying the reception of this packet was lost rather than the data packet itself. The sender thus adds this packet to a list of potentially lost packets, called the presumed lost list. Each time a SACK packet arrives, the known missing ranges of data from the SACK packet are compared to the packets in the presumed lost list. Packets that contain data known to be missing are declared actually lost and are subsequently retransmitted. In this way, the two schemes are combined to give the sender better information about which packets have been lost and need to be retransmitted.

Transaction Boundary Detection

In some embodiments, the appliance 200 or flow controller 220 applies a technique referred to as transaction boundary detection. In one embodiment, the technique pertains to ping-pong behaved connections. At the TCP layer, ping-pong behavior is when one communicant—a sender—sends data and then waits for a response from the other communicant—the receiver. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse in some embodiments, for example requiring a minimum one second value in all cases), poor application behavior may be seen in these situations.

In one embodiment, the sender of data or a flow control module 220 coupled to the sender detects a transaction boundary in the data being sent. Upon detecting a transaction boundary, the sender or a flow control module 220 sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate.

One method of detecting a transaction boundary is time based. If the sender has been sending data and ceases, then after a period of time the sender or flow control module 200 declares a transaction boundary. This may be combined with other techniques. For example, the setting of the PSH (TCP Push) bit by the sender in the TCP header may indicate a transaction boundary. Accordingly, combining the time-based approach with these additional heuristics can provide for more accurate detection of a transaction boundary. In another technique, if the sender or flow control module 220 understands the application protocol, it can parse the protocol data stream and directly determine transaction boundaries. In some embodiment, this last behavior can be used independent of any time-based mechanism.

Responsive to detecting a transaction boundary, the sender or flow control module 220 transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

In some embodiments, the boundary detection technique described herein helps to avoid a timeout when the acknowledgements for the last data packets in a transaction are dropped. When the sender or flow control module 220 receives the acknowledgements for these additional data packets, the sender can determine from these additional acknowledgements whether the last data packets have been received or need to be retransmitted, thus avoiding a timeout. In one embodiment, if the last packets have been received but their acknowledgements were dropped, a flow control module 220 generates an acknowledgement for the data packets and sends the acknowledgement to the sender, thus communicating to the sender that the data packets have been delivered. In another embodiment, if the last packets have not been received, a flow control module 200 sends a packet to the sender to cause the sender to retransmit the dropped data packets.

Repacketization

In yet another embodiment, the appliance 200 or flow controller 220 applies a repacketization technique for improving the flow of transport layer network traffic. In some embodiments, performance of TCP is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size. In some cases, it may be difficult for a TCP endpoint to choose an optimal packet size. For example, the optimal packet size may vary across the transmission path, depending on the nature of each link.

By inserting an appliance 200 or flow control module 220 into the transmission path, the flow controller 220 monitors characteristics of the link and repacketizes according to determined link characteristics. In one embodiment, an appliance 200 or flow controller 220 repacketizes packets with sequential data into a smaller number of larger packets. In another embodiment, an appliance 200 or flow controller 220 repacketizes packets by breaking part a sequence of large packets into a larger number of smaller packets. In other embodiments, an appliance 200 or flow controller 220 monitors the link characteristics and adjusts the packet sizes through recombination to improve throughput.

QoS

Still referring to FIG. 2, the flow controller 220, in some embodiments, may include a QoS Engine 236, also referred to as a QoS controller. In another embodiment, the appliance 200 and/or network optimization engine 250 includes the QoS engine 236, for example, separately but in communication with the flow controller 220. The QoS Engine 236 includes any logic, business rules, function or operations for performing one or more Quality of Service (QoS) techniques improving the performance, operation or quality of service of any of the network connections. In some embodiments, the QoS engine 236 includes network traffic control and management mechanisms that provide different priorities to different users, applications, data flows or connections. In other embodiments, the QoS engine 236 controls, maintains, or assures a certain level of performance to a user, application, data flow or connection. In one embodiment, the QoS engine 236 controls, maintains or assures a certain portion of bandwidth or network capacity for a user, application, data flow or connection. In some embodiments, the QoS engine 236 monitors the achieved level of performance or the quality of service corresponding to a user, application, data flow or connection, for example, the data rate and delay. In response to monitoring, the QoS engine 236 dynamically controls or adjusts scheduling priorities of network packets to achieve the desired level of performance or quality of service.

In some embodiments, the QoS engine 236 prioritizes, schedules and transmits network packets according to one or more classes or levels of services. In some embodiments, the class or level service may include: 1) best efforts, 2) controlled load, 3) guaranteed or 4) qualitative. For a best efforts class of service, the appliance 200 makes reasonable effort to deliver packets (a standard service level). For a controlled load class of service, the appliance 200 or QoS engine 236 approximates the standard packet error loss of the transmission medium or approximates the behavior of best-effort service in lightly loaded network conditions. For a guaranteed class of service, the appliance 200 or QoS engine 236 guarantees the ability to transmit data at a determined rate for the duration of the connection. For a qualitative class of service, the appliance 200 or QoS engine 236 the qualitative service class is used for applications, users, data flows or connection that require or desire prioritized traffic but cannot quantify resource needs or level of service. In these cases, the appliance 200 or QoS engine 236 determines the class of service or prioritization based on any logic or configuration of the QoS engine 236 or based on business rules or policies. For example, in one embodiment, the QoS engine 236 prioritizes, schedules and transmits network packets according to one or more policies as specified by the policy engine 295, 295'.

Protocol Acceleration

The protocol accelerator 234 includes any logic, business rules, function or operations for optimizing, accelerating, or otherwise improving the performance, operation or quality of service of one or more protocols. In one embodiment, the protocol accelerator 234 accelerates any application layer protocol or protocols at layers 5-7 of the network stack. In other embodiments, the protocol accelerator 234 accelerates a transport layer or a layer 4 protocol. In one embodiment, the protocol accelerator 234 accelerates layer 2 or layer 3 protocols. In some embodiments, the protocol accelerator 234 is configured, constructed or designed to optimize or accelerate each of one or more protocols according to the type of data, characteristics and/or behavior of the protocol. In another embodiment, the protocol accelerator 234 is configured, constructed or designed to improve a user experience, response times, network or computer load, and/or network or bandwidth utilization with respect to a protocol.

In one embodiment, the protocol accelerator 234 is configured, constructed or designed to minimize the effect of WAN latency on file system access. In some embodiments, the protocol accelerator 234 optimizes or accelerates the use of the CIFS (Common Internet File System) protocol to improve file system access times or access times to data and files. In some embodiments, the protocol accelerator 234 optimizes or accelerates the use of the NFS (Network File System) protocol. In another embodiment, the protocol accelerator 234 optimizes or accelerates the use of the File Transfer protocol (FTP).

In one embodiment, the protocol accelerator 234 is configured, constructed or designed to optimize or accelerate a protocol carrying as a payload or using any type and form of markup language. In other embodiments, the protocol accelerator 234 is configured, constructed or designed to optimize or accelerate a HyperText Transfer Protocol (HTTP). In another embodiment, the protocol accelerator 234 is configured, constructed or designed to optimize or accelerate a protocol carrying as a payload or otherwise using XML (eXtensible Markup Language).

Transparency and Multiple Deployment Configuration

In some embodiments, the appliance 200 and/or network optimization engine 250 is transparent to any data flowing across a network connection or link, such as a WAN link. In one embodiment, the appliance 200 and/or network optimization engine 250 operates in such a manner that the data flow across the WAN is recognizable by any network monitoring, QOS management or network analysis tools. In some embodiments, the appliance 200 and/or network optimization engine 250 does not create any tunnels or streams for transmitting data that may hide, obscure or otherwise make the network traffic not transparent. In other embodiments, the appliance 200 operates transparently in that the appliance does not change any of the source and/or destination address information or port information of a network packet, such as internet protocol addresses or port numbers. In other embodiments, the appliance 200 and/or network optimization engine 250 is considered to operate or behave transparently to the network, an application, client, server or other appliances or computing device in the network infrastructure. That is, in some embodiments, the appliance is transparent in that network related configuration of any device or appliance on the network does not need to be modified to support the appliance 200.

The appliance 200 may be deployed in any of the following deployment configurations: 1) in-line of traffic, 2) in proxy mode, or 3) in a virtual in-line mode. In some embodiments, the appliance 200 may be deployed inline to one or more of the following: a router, a client, a server or another network device or appliance. In other embodiments, the appliance 200 may be deployed in parallel to one or more of the following: a router, a client, a server or another network device or appliance. In parallel deployments, a client, server, router or other network appliance may be configured to forward, transfer or transit networks to or via the appliance 200.

In the embodiment of in-line, the appliance 200 is deployed inline with a WAN link of a router. In this way, all traffic from the WAN passes through the appliance before arriving at a destination of a LAN.

In the embodiment of a proxy mode, the appliance 200 is deployed as a proxy device between a client and a server. In some embodiments, the appliance 200 allows clients to make indirect connections to a resource on a network. For example, a client connects to a resource via the appliance 200, and the appliance provides the resource either by connecting to the resource, a different resource, or by serving the resource from a cache. In some cases, the appliance may alter the client's request or the server's response for various purposes, such as for any of the optimization techniques discussed herein. In other embodiments, the appliance 200 behaves as a transparent proxy, by intercepting and forwarding requests and responses transparently to a client and/or server. Without client-side configuration, the appliance 200 may redirect client requests to different servers or networks. In some embodiments, the appliance 200 may perform any type and form of network address translation, referred to as NAT, on any network traffic traversing the appliance.

In some embodiments, the appliance 200 is deployed in a virtual in-line mode configuration. In this embodiment, a router or a network device with routing or switching functionality is configured to forward, reroute or otherwise provide network packets destined to a network to the appliance 200. The appliance 200 then performs any desired processing on the network packets, such as any of the WAN optimization techniques discussed herein. Upon completion of processing, the appliance 200 forwards the processed network packet to the router to transmit to the destination on the network. In this way, the appliance 200 can be coupled to the router in parallel but still operate as it if the appliance 200 were inline. This deployment mode also provides transparency in that the source and destination addresses and port information are preserved as the packet is processed and transmitted via the appliance through the network.

End Node Deployment

Although the network optimization engine 250 is generally described above in conjunction with an appliance 200, the network optimization engine 250, or any portion thereof, may be deployed, distributed or otherwise operated on any end node, such as a client 102 and/or server 106. As such, a client or server may provide any of the systems and methods of the network optimization engine 250 described herein in conjunction with one or more appliances 200 or without an appliance 200.

Figure 3:
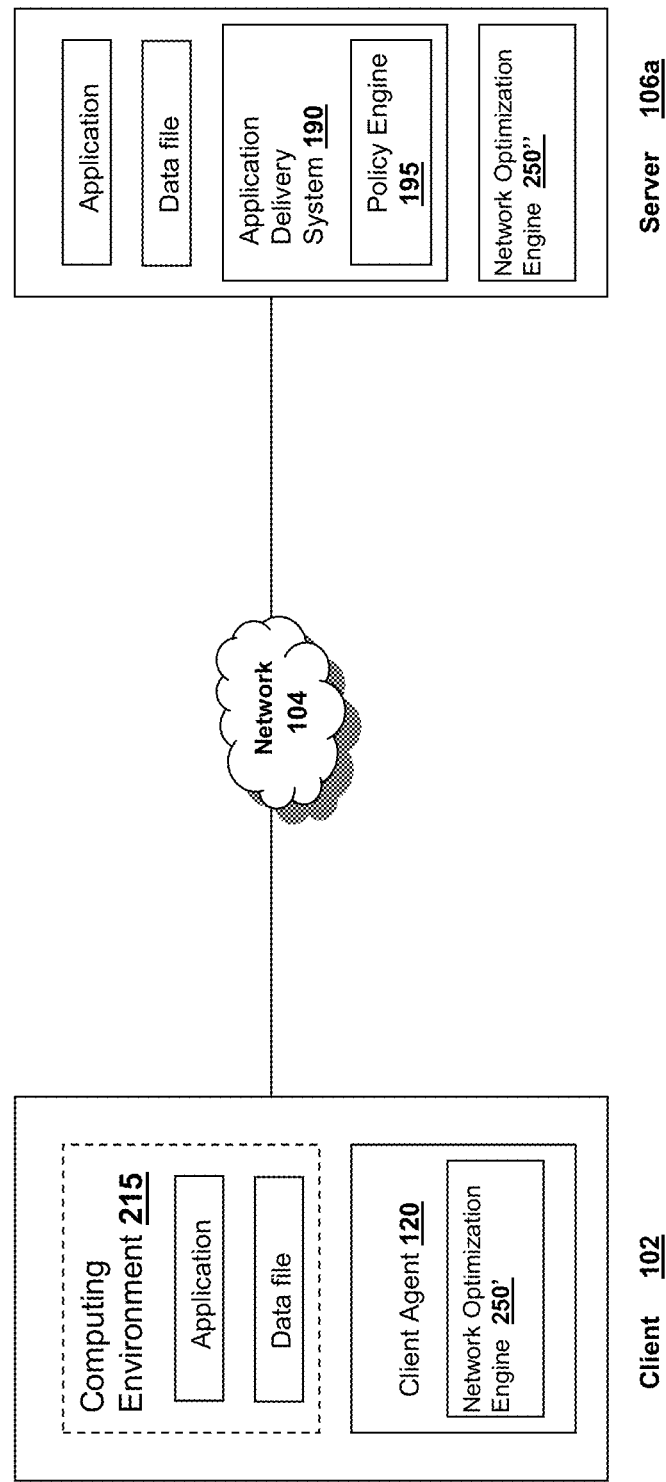
FIG. 3 is a block diagram of another embodiment of a client and/or server deploying the network optimization features of the appliance.

Referring now to FIG. 3, an example embodiment of the network optimization engine 250 deployed on one or more end nodes is depicted. In brief overview, the client 102 may include a first network optimization engine 250' and the server 106 may include a second network optimization engine 250". The client 102 and server 106 may establish a transport layer connection and exchange communications with or without traversing an appliance 200.

In one embodiment, the network optimization engine 250' of the client 102 performs the techniques described herein to optimize, accelerate or otherwise improve the performance, operation or quality of service of network traffic communicated with the server 106. In another embodiment, the network optimization engine 250" of the server 106 performs the techniques described herein to optimize, accelerate or otherwise improve the performance, operation or quality of service of network traffic communicated with the client 102. In some embodiments, the network optimization engine 250' of the client 102 and the network optimization engine 250" of the server 106 perform the techniques described herein to optimize, accelerate or otherwise improve the performance, operation or quality of service of network traffic communicated between the client 102 and the server 106. In yet another embodiment, the network optimization engine 250' of the client 102 performs the techniques described herein in conjunction with an appliance 200 to optimize, accelerate or otherwise improve the performance, operation or quality of service of network traffic communicated with the client 102. In still another embodiment, the network optimization engine 250" of the server 106 performs the techniques described herein in conjunction with an appliance 200 to optimize, accelerate or otherwise improve the performance, operation or quality of service of network traffic communicated with the server 106.

C. Systems and Methods for Allocating a Different Class of Service to Each Network Connection in a Plurality of Network Connections In many embodiments using remote display protocols such as ICA or remote desktop, data from applications including graphical data may be encapsulated by the remote-display protocol, prior to being encapsulated by a transport layer protocol. While the remote-display protocol may divide the application data into one or more virtual channels, an intermediary that is only capable of interpreting the transport layer protocol headers may not be able to detect these virtual channels. Furthermore, if the remote-display protocol includes encryption, even an intermediary capable of interpreting unencrypted higher layer information may not be able to detect the virtual channels or application layer payload data. Accordingly, the remote-display protocol may obscure application network traffic.

Because the application network traffic is obscured, conventional network tuning mechanisms may not work. For example, tuning mechanisms that detect voice over IP communications or video payloads and accelerate these communications at a high priority, while queuing email traffic at a low priority may be unable to work if they cannot determine which data in an encapsulated and/or encrypted remote-display session is which.

One solution, discussed in more detail herein, is to split a plurality of virtual channels of a remote-display session across a plurality of transport layer connections, each of which may be prioritized individually. For example, video data may be sent to a high priority virtual channel and communicated via a first transport layer connection at a high priority, while email data may be sent to a low priority or background priority virtual channel and communicated via a second transport layer connection at a low priority. In some embodiments, differentiated services, ToS or other mechanisms may be used to prioritize the transport layer sessions. In another embodiment, video or voice communications may be sent via a low-latency UDP transport layer connection while GUI interactions such as mouse and keyboard data may be sent via a reliable TCP transport layer connection. This allows leveraging all of the various latency and bandwidth management schemes applied by intermediaries, while still obscuring application layer data within the remote-display session.

Accordingly, the systems and methods discussed herein may be used to provide content-type prioritization and traffic tuning (e.g. printing, voice, video, audio, file transfer, etc.), application-type prioritization and traffic tuning (e.g. browsing, productivity, mission critical), and/or user-based prioritization and traffic tuning (e.g. higher priorities for root users or administrators).

Figure 4A:
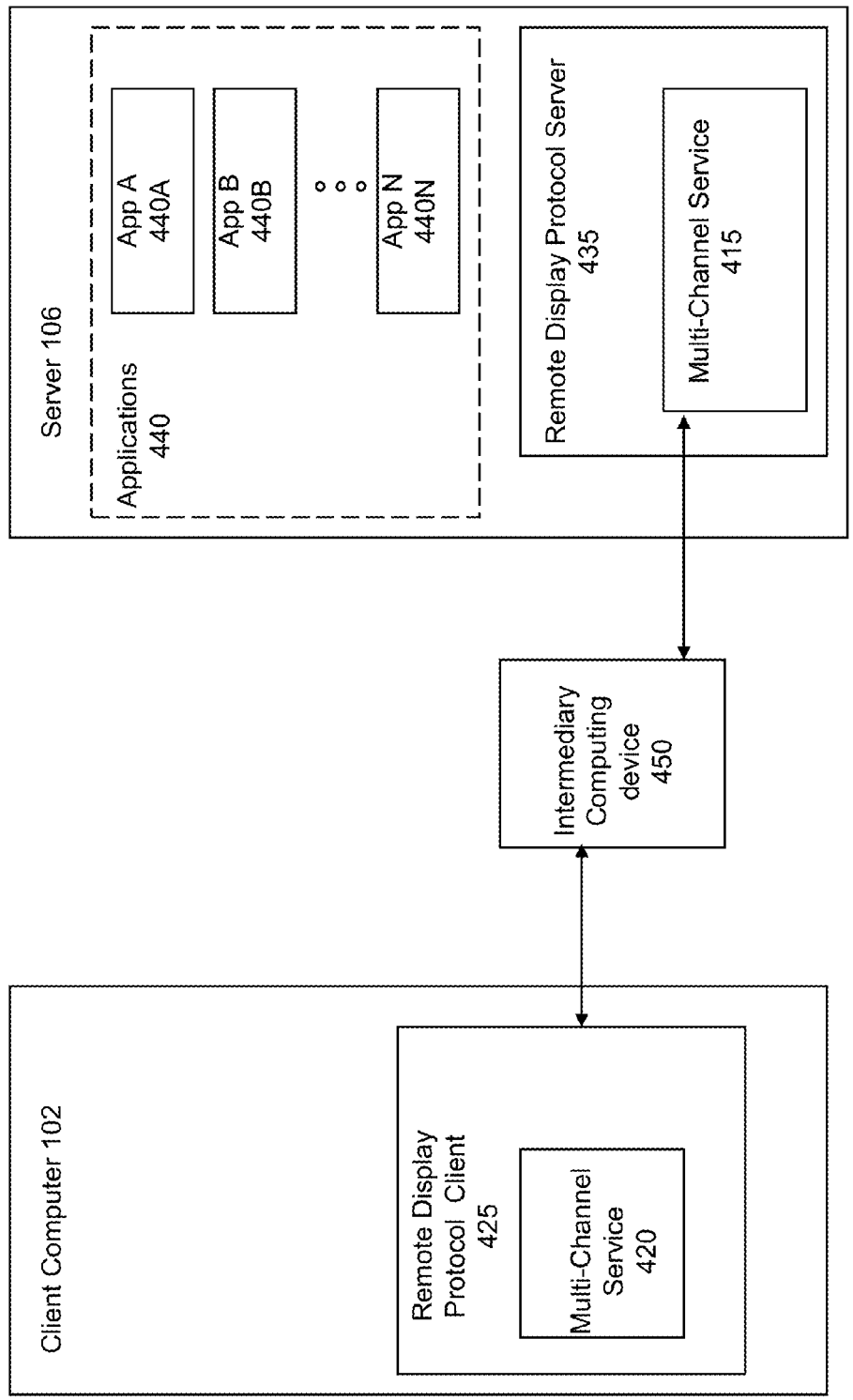
FIG. 4A is a block diagram illustrative of an embodiment of a system for assigning class of service values to virtual channels.

Illustrated in FIG. 4A is one embodiment of a system for assigning classes of service to virtual channels. In some embodiments, the system can include a client computer 102 and a server 106 that communicate via a network 104. In some embodiments, an intermediary computing device 450 on the network 104 can facilitate communication between the server 106 and the client 102. Executing on the client can be a remote-display protocol client 425 further executing a multi-channel service 420. The server can execute one or more applications 440A-440N (generally referred to as applications 440), and can also execute a remote-display protocol server 435 further executing a multi-channel service 415.

Further referring to FIG. 4A, and in more detail, in one embodiment the system can include a client computer 102 and a server 106. The client computer 102 can be any computing device 100 described herein and can be any client 102 described herein. Similarly, the server 106 can be any computing device 100 described herein and can be any server 106 described herein. In some embodiments, the server 106 can be a server farm that includes one or more servers 106. The client 102 and the server 106 can communicate over a network 104 such as any network 104 described herein.

In some embodiments the remote-display protocol client 425 executing on the client 102 can be an application, client or program that can receive application output from a remote-display protocol server 435 executing on the server 106. The remote-display protocol client 425 of the client 102 can receive application output and display the application output in an application window on the client 102. In some embodiments, the remote-display protocol client 425 can facilitate the creation of a virtual channel between the client 102 and the server 106, and can facilitate communication between the remote-display protocol system of the client 102 and the remote-display protocol system of the server 106. The remote-display protocol client 425 of the client computer 102 can communicate with the remote-display protocol server 435 of the server 106 and can transmit and receive file access requests. In some embodiments, the remote-display protocol client 425 can be an ICA client manufactured by CITRIX SYSTEMS.

The remote-display protocol server 435 of the server 106 can execute on the server 106 and can interface with applications 440 executing on the server 106. In some embodiments, the remote-display protocol server 435 can intercept, retrieve or receive graphical application output, e.g. draw commands issued by an application 440, generated by an application 440 and can forward the application output together with any related image data to the remote-display protocol client 425 of the client 102. The remote-display protocol client 425 of the client computer 102 can use the application output and image data to redraw the application as it would be displayed on a display screen of the server 106. In some embodiments, the remote-display protocol server 435 can be an ICA server manufactured by CITRIX SYSTEMS. The remote-display protocol client 425 of the client 102 can communicate with the sremote-display protocol server 435 over a virtual channel.

In some embodiments, the remote-display protocol client 425 of the client 102, and the remote-display protocol server 435 of the server 106 execute a multi-channel service 420, 415. This service 420 can execute on either machine and can assign one or more virtual channels to a transport layer connection, such as a TCP connection. In some embodiments, the multi-channel service 420 can also assign a priority to available transport layer connections/and or the class of service associated with each transport layer connection. For example, a multi-channel service 415 executing on the server 106 can assign a virtual channel carrying real-time video and audio to a transport layer connection having a highest class of service. In some embodiments, transport layer connections can either have a class of service, quality of service or priority level (generally referred to as a class of service) associated with that connection. The associated class of service can indicate that network traffic transmitted over that particular transport layer connection should be given higher priority than network traffic transmitted over a different transport layer connection with a lower class of service. Just as the multi-channel service 415 of the server 106 can assign virtual channels to a particular transport layer connection having a particular class of service, so too can the multi-channel service 420 of the client 102.

The applications 440 can be any application. In some embodiments, the application 440 can include any application described herein, or any other application. Applications 440 can interface with the remote-display protocol server 435 by transmitting application output to the remote-display protocol server 435.

Communication between the client 102 and the server 106 can be facilitated by an intermediary computing device 450 on the network 104. In some embodiments, the intermediary computing device 450 can be a network router that can receive and transmit network traffic according to the quality of service associated with each network packet and according to the quality of service associated with a destination port or source port, or destination address or source address or any combination of an address or port. Intermediary computing device 450 may communicate with client 102 and server 106 via a WAN, LAN, MAN, or any combination of one or more networks. In other embodiments, the intermediary computing device 450 can be a branch repeater manufactured by CITRIX SYSTEMS. The branch repeater, in some embodiments, can receive and transmit network traffic according to the quality of service associated with each network packet. The intermediary computing device 450, in some embodiments, can facilitate the transmission of data over one or more virtual channels where each virtual channel can have a different associated class of service. A class of service, in some embodiments, can be assigned by a service executing on the server 106, a service executing on the client 106 or an intermediary computing device 450 on the network. For example, in some embodiments, the service can be the multi-channel service 420 or 415. In still other embodiments, the intermediary computing device 450, such as a router or branch repeater, may assign a class of service. In other embodiments, an application executing on the server 106 can assign one or more virtual channels to a transport layer session, and the appliance 450 can assign a class of service to the transport layer session based on the port number and/or address of the transport layer session.

In some embodiments, the client and server may communicate via a remote-display protocol comprising one or more virtual channels and carried by or encapsulated as the payload of a transport layer communication. In some embodiments, the remote-display protocol may be a protocol for setting up Multi Stream ICA (MSI) connections, or connections in which a plurality of virtual channels of a single ICA session are divided among a plurality of transport layer connections, rather than being carried by a single transport layer stream. An ICA or Independent Computing Architecture connection may comprise one or more virtual channels established between a client and a server to transmit application output from the server to the client. The ICA connection may be established during an ICA session using the ICA protocol developed by CITRIX SYSTEMS. In some embodiments, Multi Stream ICA (MSI) or a similar multi-stream remote-display protocol may be used when an ICA Client application supports MSI, or when there is a Citrix Branch Repeater that supports MSI or third party Router that supports TCP or UDP Quality of Service or any other similar type and form of product that supports MSI. Accordingly, in many embodiments, a client, server, and/or intermediary may determine during establishment of a session, whether one or more of the entities are capable of establishing and communicating via a multi-stream remote-display protocol. This may be done through the exchange of options flags during TCP handshaking, exchanged configuration parameters or files, or by any other means.

In some embodiments, an ICA session may be established using a single transport layer connection. This may be done on a first predetermined port, such as port 1494. After the ICA Session is connected and initialized, in some embodiments, the ICA stack, server agent, or client agent may determine if MSI is enabled. If MSI is enabled then, in some embodiments, one or more transport layer connections may be added to the ICA session, such as three additional TCP connections. For an MSI ICA Session the initial ICA TCP connection (such as the aforementioned connection on port 1494) may be considered the Primary Connection and the other TCP connections as Secondary.

Figure 4B:
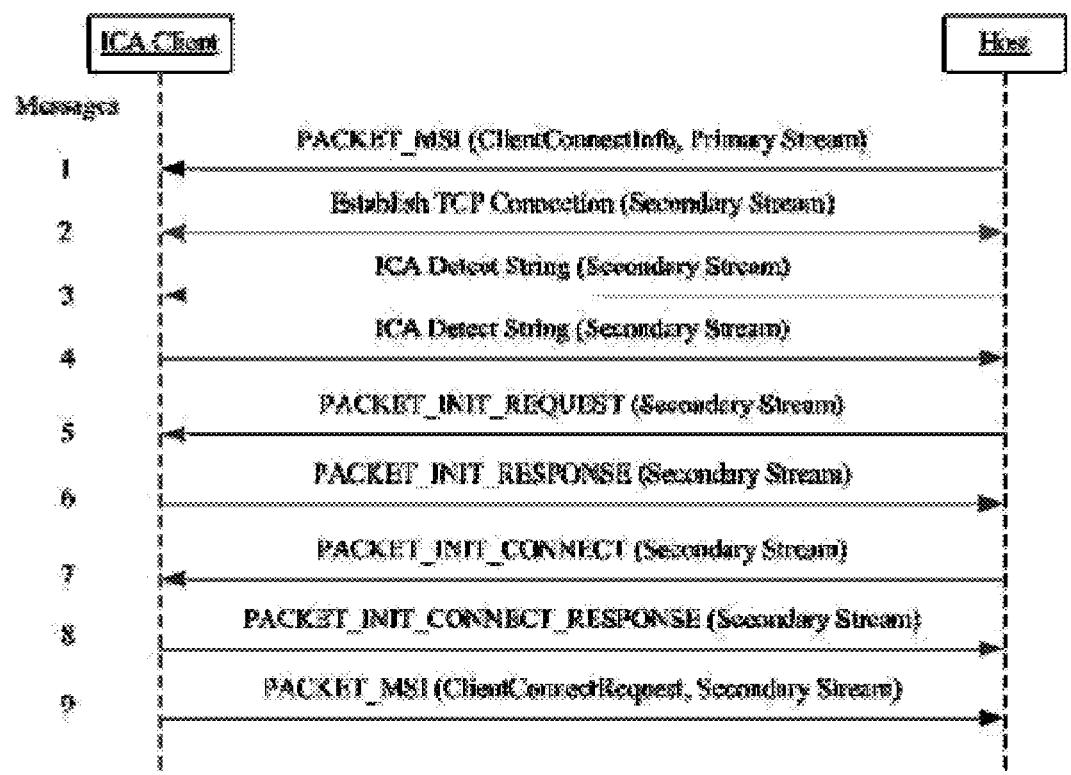
FIG. 4B is a message sequence chart illustrating an embodiment of a method of establishing multiple transport layer connections for a multi-stream remote-display protocol.

Referring now to FIG. 4B, illustrated is a message sequence chart showing an embodiment of establishing multiple transport layer connections for a multi-stream remote-display protocol. In some embodiments, the messages shown may comprise one or more additional transactions. For example, message 2 discusses establishing a TCP connection. In many embodiments, this may comprise three separate transactions as part of a three-way handshake. Accordingly, the sequence chart illustrated in FIG. 4B should be considered an abstraction of a sequence of a plurality of messages rather than denoting the only messages communicated between the computing devices.

Prior to the sequence shown in FIG. 4B, the host and client may establish a first or primary connection, and may establish a remote-display protocol session, such as an ICA session, via the primary connection. This may comprise creating an ICA stack for the primary connection. In some embodiments, the host may create an ICA stack for one or more secondary connections. The ICA stack or stacks for the secondary connection may be the same as the primary connection, and only the Protocol Drivers that need to be initialized may be initialized. In some embodiments, message 1 may comprise a multi-stream protocol initialization message, such as a Multi-Stream ICA (MSI) message. In one embodiment, message 1 may be sent responsive to the multi-stream protocol being enabled. Once the ICA session or other protocol session has been initialized on the primary connection, if multi-streaming is enabled then multi-stream setup begins. While setting up the multi-stream session, the remote-display protocol session may continue to work as if multi-streaming was not supported. The initialization message may include a Server Session Cookie, a TCP Port number and a QoS Class (such as RealTime, Interactive, Bulk, and Background, in descending order of priority), and a list of the virtual channels that will be using this QoS connection.

In response to message 1, at message 2, the client and host may establish a secondary TCP connection. The secondary TCP connection may be established using the IP address of the primary connection and the TCP port sent in the initialization message. As discussed above, establishing the connection may comprise multiple messages of a handshaking sequence. In some embodiments, the server may set a timeout timer set to a predetermined value after transmitting message 1. If the timeout timer expires before the arrival of message 9, discussed in more detail below, then in some embodiments, the host may assume that establishing the secondary stream failed and fallback to a single stream mode. In a further embodiment in which sequence 4B is repeated for multiple secondary streams (also referred to as secondary, tertiary, etc.), expiration of the timeout timer during establishment of any secondary connection may cause the host to close any previously established secondary connection with the client and fall back to a single stream mode. For example, if the host timer expires while establishing a third secondary stream, the host may close the first and second secondary streams and fall back to just the primary stream.

Because the secondary TCP connection may be indistinguishable from a primary connection from a second client, at this stage, the host may treat the secondary TCP connection as a new remote-display protocol connection. Accordingly, at message 3, the host may detect the client connection established at message 2 and send to the Client an ICA Detect String or request messages via the secondary connection. The host may wait for the Client to send an ICA Detect String in response. At message 4, once the client receives the ICA Detect String, the client can send the host an ICA Detect String.

At message 5, the host may create a packet_init_request message to send to the client. The init request may include one or more fields or blocks, discussed in more detail below, to identify: a capability block indicating the server is capable of using a multi-stream protocol; a server protocol version; one or more server flags to identify if the host can support single port and/or multi port multi-stream connections.

The init request may include a capability block or data field or flag indicating that the host is capable of using a multi-stream remote-display protocol. In one embodiment, the capability block may be initialized to a predetermined value, such as 0, to indicate this capability. In some embodiments, the request may further identify a protocol version of the host's multi-stream protocol capability, and one or more flags to indicate if the host supports single-port or multi-port multi-stream sessions.

In some embodiments in which messages traverse one or more intermediaries (not illustrated) between the host and client, the init request may further include one or more data blocks or strings to identify if the intermediary supports multi-stream remote-display protocols, and single-port or multi-port capability. If one embodiment, if an intermediary does not support multi-stream protocols, then it may not identify the capability block, previously initialized by the server, because it may not be able to interpret the capability block. If the intermediary does support the multi-stream protocols, then it may modify the capability block by assigning a latest-supported protocol version of the intermediary to the block, and may modify one or more of the server flags to reflect capabilities of the intermediary.

Message 6 may comprise a response to the init request message. The client may include the capability block received from the server and/or modified by one of the intermediaries as a capability block of the init response. The client may further include flags or identifiers indicating its protocol version and may, in some embodiments, set a multi-stream enabled flag.

Message 7 may comprise a connection initialization message. The host may copy the capability block of the init response received from the client into a capability block of the initialization message. In some embodiments in which all of the devices (host, client, and one or more intermediaries) support the multi-stream remote-display protocol, the host may set a first flag enabling the multi-stream communication, and a second flag selecting either single-port or multi-port communication, responsive to a corresponding flag received from a server-side intermediary, if any. If there are no intermediaries between the client and host or no multi-stream capable intermediaries (such as a switch or router that does not interpret the remote-display protocol or flags), the host may enable the multi-stream communication, and set a flag selecting multi-port communication.

Message 8 may comprise a connection response. The connection response may comprise an acknowledgment of the connection initialization message.

At message 9, the client may send a response to message 1, or a client connect request multi-stream ICA message via the secondary stream. The client connect request may include a server session cookie and/or the QoS class sent as part of message 1, and may further include a client cookie or globally unique identifier (GUID) generated by the client to identify and authenticate the secondary stream, discussed below in connection with FIG. 4C. Upon receipt of this message, in some embodiments, the host may use the server session cookie to look up the ICA session or other remote-display protocol session the secondary connection is to be associated with. If the session is not found, then the secondary connection may be closed by the host. If the session is found, in a further embodiment, the host may send a synchronization message via the primary connection.

While only one secondary connection is shown, in many embodiments, multiple secondary connections may be established, which may correspond to different priorities of remote-display protocol transmissions and/or virtual channels. In some embodiments, each secondary connection can be setup independently from the other secondary connections. Secondary connections, in some embodiments, can be setup in parallel. In some embodiments, an additional secondary connection (or tertiary connection) can be set up before the first secondary connection is fully established. Accordingly, messages 1-9 may be repeated on additional transport layer connections for each QoS class. In one embodiment, the primary connection may correspond to the highest priority QoS class. This may be done so that failure to connect on any secondary connection does not end the remote-display protocol session, but merely that it may not use that particular QoS connection. In many embodiments, the host may try to re-establish any secondary connection that times out. In other embodiments, as discussed above, a time out on any secondary connection may cause the host to drop or close all established secondary connections of the session and fall back to single-stream operation.

In a further embodiment, communications via each transport layer connection may be tagged with a granular QoS priority tag. The priority tag may be placed, in some embodiments, in the header of a remote-display protocol message. Intermediaries capable of reading the header may then apply a higher level of granularity of QoS priority, without needing to further examine encapsulated and/or encrypted session data.

Figure 4C:
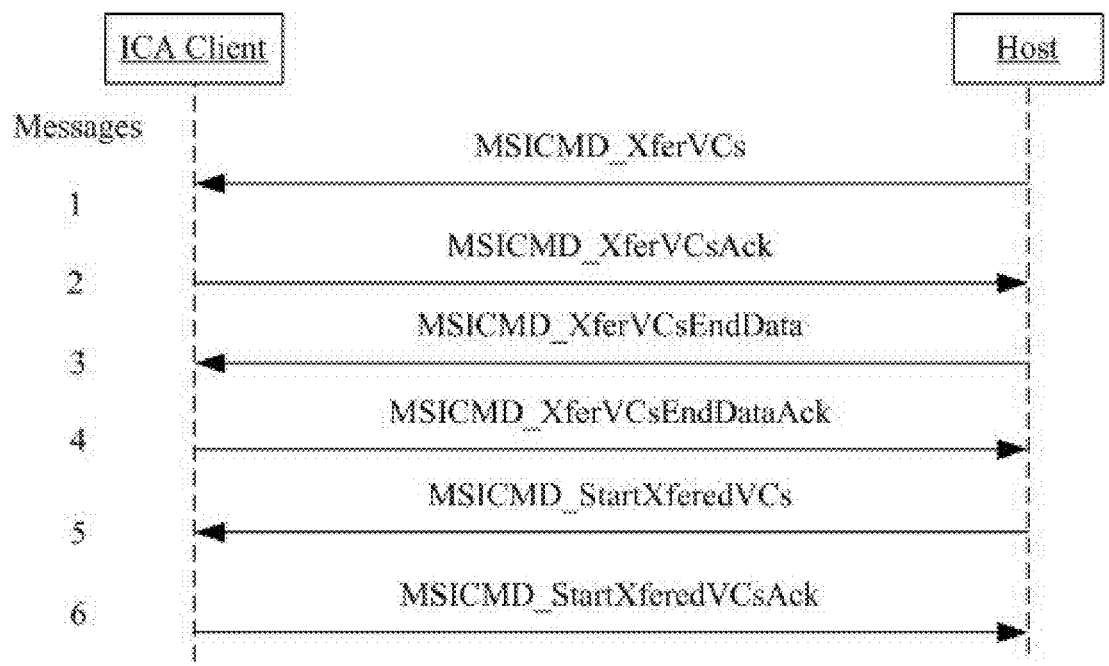
FIG. 4C is a message sequence chart illustrating an embodiment of a method of transferring virtual channels from a first transport layer connection to a second transport layer connection for a multi-stream remote-display protocol.

Referring now to FIG. 4C, illustrated is a message sequence diagram of an embodiment of a method of transferring virtual channels from a first transport layer connection to a second transport layer connection for a multi-stream remote-display protocol. As discussed above in connection with FIG. 4B, the messages illustrated should be considered abstractions, and may thus represent one or more actual communications.

At message 1, the host may transmit a virtual channel transfer command (XferVCs) via the primary connection. In some embodiments, the host may set a timeout on transmission of the message, and if the timeout expires, the host may disconnect the secondary channels and/or primary channel of the session. The XferVCs command may include a destination connection value, such as a connection identifier of a secondary stream or the primary stream. In some embodiments, the XferVCs command may further include an identifier of a total number of virtual channels to be transferred, and a list of identification numbers or channel IDs of each virtual channel to be transferred.

In one embodiment, the XferVCs command may include a server session cookie and client cookie discussed above. Upon receipt, the client may compare the client cookie in the XferVCs command to the client cookie sent during connection establishment (FIG. 4B, message 9). If the cookies are different, the client may disconnect the ICA session. This may be done because the secondary stream may not have been started by that client.

At message 2, the client may reply with an acknowledgement (XferVCsAck) packet on the primary stream. The acknowledgement may include the server session cookie from the transfer command message. In some embodiments, upon sending the reply, the client may block write operations on the virtual channels that are being transferred. This may be done to flush the channels. In a further embodiment, the client may set a timeout timer. If the timer expires prior to the client receiving an EndData command (message 3), the client may disconnect the ICA session.

At message 3, the host may send an end data message (XferVCsEndData) to the client on the connection currently being used by the virtual channels to be transferred (e.g. the primary stream, initially, or other streams after they've been transferred). The end data message may include the server session cookie, the identifier of the total number of virtual channels to be transferred, and the list of identification numbers or channel IDs of each virtual channel to be transferred. In some embodiments, the host may block write operations on the virtual channels that are being transferred prior to sending message 3. This may be done to flush the channel, and message 3 may indicate to the client that there will be no more data arriving for the virtual channels to be transferred. In one embodiment, the host may block write operations after sending message 1. In some embodiments, the host may set a timeout timer on transmission of message 3. If the timer expires prior to the host receiving an acknowledgement, the host may disconnect the ICA session.

At message 4, the client may reply with an acknowledgement message (XferVCsEndDataAck) on the stream on which the client received the end data message. The acknowledgement may include the server session cookie, the identifier of the total number of virtual channels to be transferred, and the list of identification numbers or channel IDs of each virtual channel to be transferred. The acknowledgement may indicate to the host that there will be no further data arriving for the virtual channels to be transferred (i.e. the end data message and acknowledgment message are the last messages transferred via the virtual channel). In a further embodiment, the client may set a timeout timer. If the timer expires prior to the client receiving a start command (message 5), the client may disconnect the ICA session.

At message 5, the host may send a start command (StartXferedVCs). The start command may be sent on the ICA stream or TCP connection that the virtual channels are being transferred to. The message may indicate to the client that the host is ready to receive and send data on the transferred virtual channels. In some embodiments, the start command may include the server session cookie, the identifier of the total number of transferred virtual channels, and the list of identification numbers or channel IDs of each transferred virtual channel. In some embodiments, the host may set a timeout timer on transmission of message 5. If the timer expires prior to the host receiving an acknowledgement, the host may disconnect the ICA session.

At message 6, the client may reply with an acknowledgment (StartXferedVCsAck) on the ICA stream or TCP connection that the virtual channels have been transferred to. The acknowledgment may include the server session cookie, the identifier of the total number of transferred virtual channels, and the list of identification numbers or channel IDs of each transferred virtual channel. The acknowledgment may indicate to the host that the client is ready to receive and send data on the transferred virtual channels. After sending message 6, the client may unblock writes on the channels and start sending virtual channel data on the transferred virtual channels. Once the host receives the acknowledgment, the host may similarly unblock writes and start sending data on the transferred virtual channels. In some embodiments, the message sequence of FIG. 4C may be repeated for each additional stream that virtual channels are to be transferred to.

Prior to discussing specifics of the granular priority tagging, it may be helpful to first examine the different layers of a remote-display protocol, such as the ICA protocol, and how the protocol interacts with a transport layer protocol, such as TCP, to send ICA data over an ethernet network. The priority bits used for priority tagging are determined and set within this data transmission process.

Figure 4D:
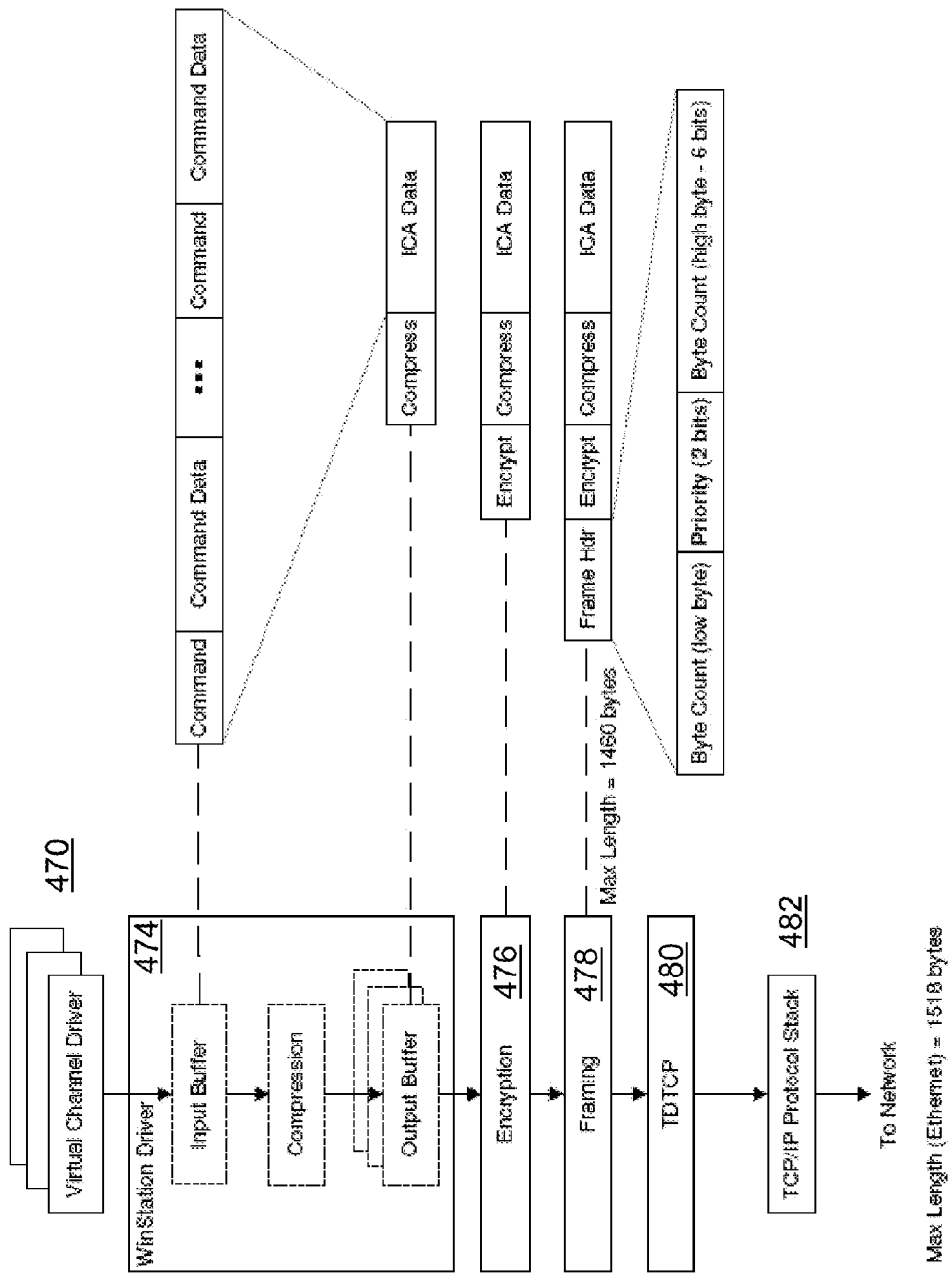
FIG. 4D is a block diagram of a network stack illustrating presentation layer data flow through the stack for delivery via a transport layer connection.

Referring briefly to FIG. 4D, illustrated is a block diagram of a network stack showing remote-display protocol data flow through the stack for delivery via a transport layer connection. Data travels through the same protocol layers in the reverse direction when received at the destination (client or server).

Each virtual channel 470 may include its own virtual channel driver that sends virtual channel data to the WinStation driver 474. The WinStation driver 474 may comprise a driver, service, daemon, routine, or other executable code for receiving virtual channel data from multiple virtual channel drivers, and packaging the data for receipt by lower network layers. The WinStation driver 474 may operate at the application, presentation, and session layers of the OSI networking model. The WinStation driver 474 may, in some embodiments, establish a remote-display protocol session between a client and a server, and maintain session information such as whether compression and encryption are turned on, and whether Priority Packet Tagging will be used. In other embodiments, the WinStation driver 474 may encode remote-display protocol command information and transform input virtual channel data into remote-display protocol packets, such as ICA packets, which are placed in the WinStation driver's input buffer. As shown, an ICA packet may comprise a command byte followed by optional command data. In some embodiments, the WinStation driver 474 may compress the packets, when compression is turned on. Multiple ICA packets may be concatenated or combined in the output buffer. The WinStation driver 474 may determine the amount of data to include in each output buffer so that the length of the data when leaving the framing protocol driver 478 does not exceed a predetermined value. In some embodiments, when compression is turned on, the WinStation driver 474 may append a compression header to the beginning of the output buffer.

The WinStation driver 474 may further determine the priority of each output buffer of a plurality of output buffers, based on the virtual channel from where the data originated, and may pass this information to the framing protocol driver 478. When multiple ICA packets are combined into one output buffer, the WinStation driver 474 may determine the priority of the output buffer based on the highest priority ICA packet included. For example, if the output buffer contains thinwire (priority 0) and printing (priority 3) ICA packets, the output buffer is given a priority of 0 based on the included thinwire data. In some embodiments, the WinStation driver 474 may forward the output buffer to the encryption protocol driver 476 when encryption is turned on.

If encryption is turned on, the encryption protocol driver 476 may add an encryption header to the output buffer data passed from the WinStation driver output buffer 474. Data after the encryption header may be encrypted, using any type and form of encryption method. This may include encrypting the compression header, if included.

The framing protocol driver 478 may calculate the byte count of the output buffer and add a framing header. In addition to the byte count, the framing header may include a two-bit priority value as determined by the WinStation driver 474. For example, if the total byte count of the output buffer is 1320 bytes and the packet is high priority, the binary value of the framing header may comprise 00 000101 00101000. The first two bits, 00, may indicate the priority or 0. The next 6 bits may comprise the byte count, or 1320, divided into a high order byte count (e.g. 000101, or 1280) and a low order byte count (e.g. 00101000, or 40). In some embodiments, the low order and high order bytes may be reversed for network transmission, such that the framing header equals the low order byte count, followed by the two priority bits and the high order byte count.

The priority bits may be used to provide the ability to prioritize ICA sessions based on the virtual channel data being transmitted. This can be accomplished by associating each virtual channel with a two-bit priority, included as part of each ICA framing header discussed above. The two bits indicate four possible priorities: high, medium, low, and background. In some embodiments, each virtual channel may be assigned one of these priority values. For example, in one embodiment, remote windows screen update data or seamless window screen update data may be given a high priority. In another embodiment, clipboard data, client audio mapping data, license management data, video server video data, or program neighborhood data may be given a medium priority. In yet another embodiment, client COM port mapping or client drive mapping data may be given a low priority. In yet still another embodiment, client management data such as an auto-client update, printer mapping for non-spooling or spooling clients, or other data may be given a background priority.

Various Quality of Service (QoS) solutions may be used to prioritize remote-display protocol traffic against all other traffic on the network. These solutions are able to identify network traffic as remote-display protocol traffic either based on the transport layer port or by identifying the remote-display protocol initialization handshake that occurs when a new session is established. Some QoS solutions can also identify remote-display protocol traffic based on other information, such as published application or source IP address. This identification allows remote-display protocol sessions to be prioritized against each other across the entire network. For example, all remote-display protocol sessions where users are running a business critical application such as Peoplesoft can be given a higher priority than sessions performing functions that are not as business critical.

Remote-display protocol Priority Packet Tagging provides QoS solutions with the opportunity to identify virtual channel priorities within a remote-display protocol session so that remote-display protocol sessions transmitting higher priority data are delivered first. QoS solutions can implement remote-display protocol Priority Packet Tagging in such a way that the transmission speed of each transport layer stream is dynamically altered based on the priority bits of the remote-display protocol data being transmitted, instead of attempting to hold back individual pieces of data within the stream.

Figure 4E:
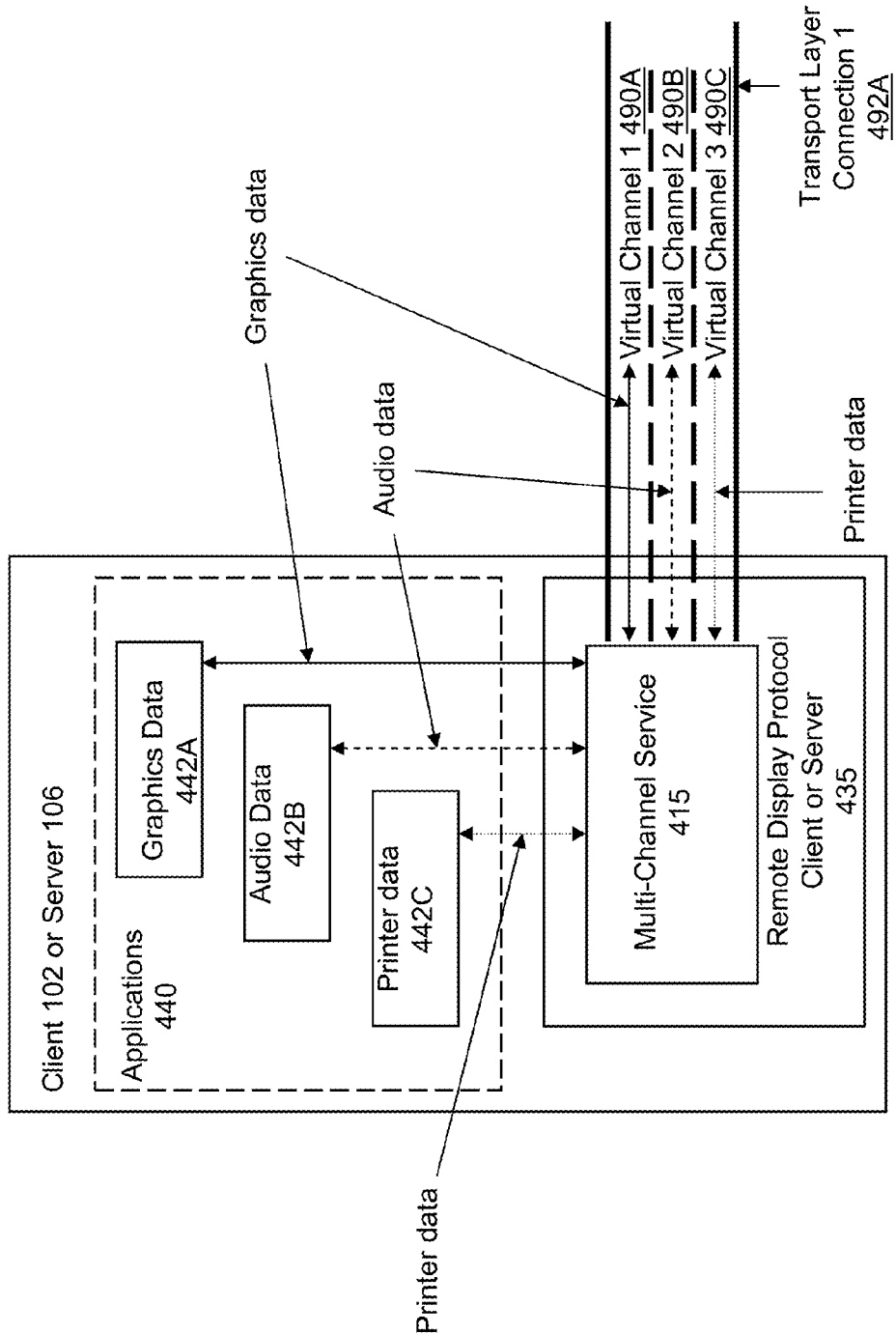
FIG. 4E is a block diagram of an embodiment of a system in which multiple virtual channels are carried via a single transport layer connection.

Illustrated in FIG. 4E is a block diagram of an embodiment of a system in which multiple virtual channels are carried via a single transport layer connection. As shown, one or more applications 440 may generate data such as graphics data 442A, audio data 442B, and printer data 442C (referred to generally as application data 442). Other data may be generated, including system configuration data, GUI or CLI interactions, file and clipboard transfer, email, video, web browsing interactions, or any other type and form of application, service, or operating system generated data. This data may be provided to a multi-channel service 415 of an application delivery server 435. A first type of data, such as graphics data 442A, shown as a solid line, is passed to a first virtual channel 490A. A second type of data, such as audio data, 442B, shown as a dashed line, is passed to a second virtual channel 490B. A third type of data, such as printer data 44C, shown as a dotted line, is passed to a third virtual channel 490C. In some embodiments, additional virtual channels and applications may be used. In many embodiments, a virtual channel does not have a one-to-one correspondence with an application, but may carry data from multiple applications. Although illustrated with a single type of data flowing to each virtual channel, in many embodiments a channel may carry multiple types of data. In other embodiments, the same type of data may go to different channels. For example, graphics update data for a foreground window may be sent to a higher priority virtual channel than graphics update data for a background or clipped window. Each virtual channel may have a priority, as discussed above, and accordingly, each virtual channel may comprise data from one or more applications to be transmitted at a designated or assigned priority.

Figure 4F:
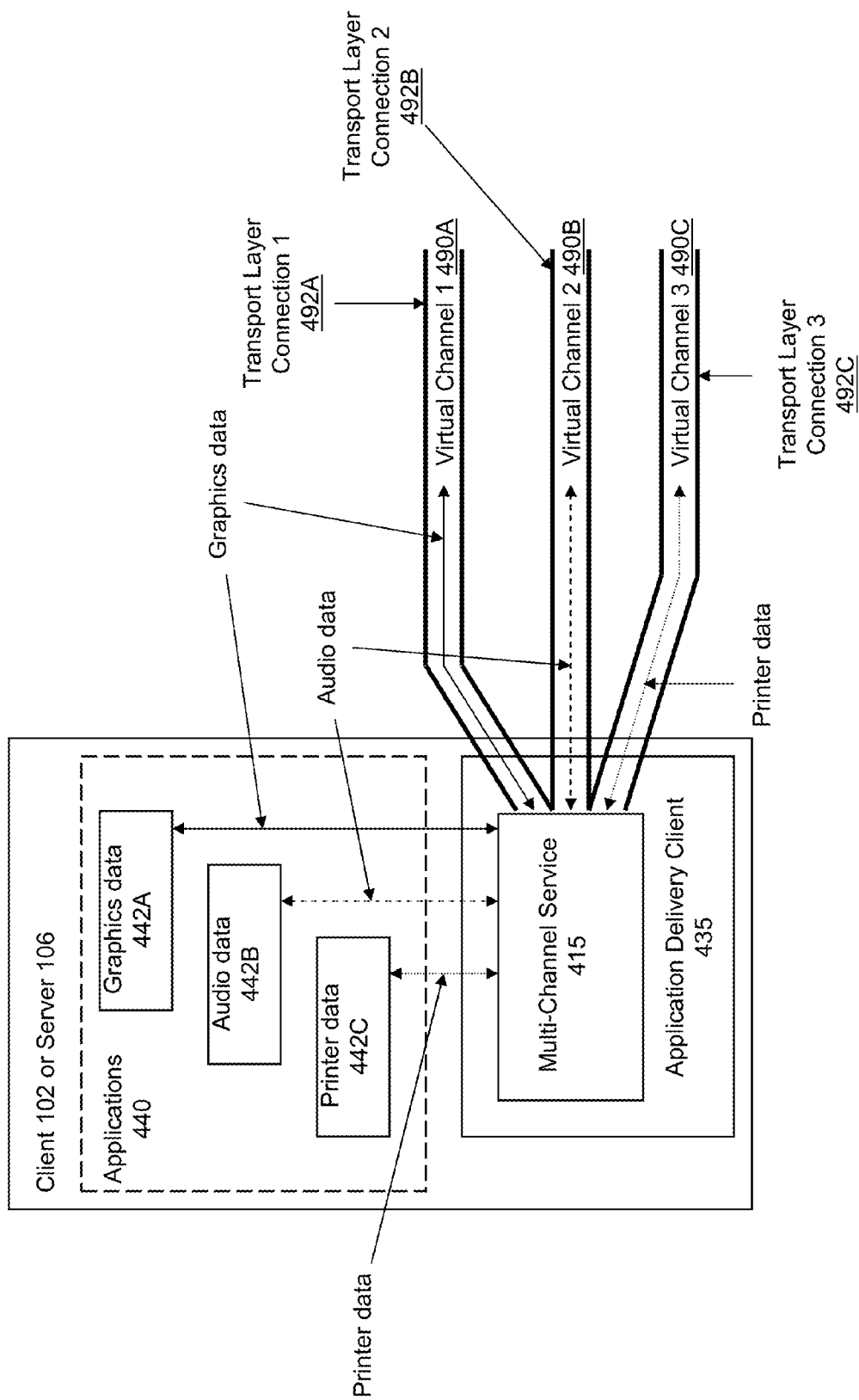
FIG. 4F is a block diagram of an embodiment of a system in which multiple transport layer connections are utilized to carry multiple virtual channels of a session.

However, as discussed above, in embodiments in which multiple virtual channels 490A-490C are transmitted or carried by a single transport layer connection 492A, intermediaries that are not able to detect the multiple virtual channels within the transport layer stream may be unable to apply different prioritization to high priority data, such as graphics data 442A, as opposed to low priority data, such as printer data 442C. Referring now to FIG. 4F, illustrated is a block diagram of an embodiment of a system in which multiple transport layer connections are utilized to carry multiple virtual channels of a session. As shown, virtual channels 490A-490C may be split to different transport layer connections 492A-492C. By setting class of service, ToS, or DiffServ flags on each transport layer connection 492A-492C, intermediaries that are unable to parse the virtual channel data streams may still prioritize a high-priority transport layer connection 1 492A (and the corresponding virtual channel 1 490A) above a low-priority transport layer connection 3 492C (and the corresponding virtual channel 3 490C). In other embodiments, intermediaries may prioritize transport layer connections based on one or more of a source IP address, source port, destination IP address, destination port, payload size, window size, time period between packets or burstiness of the flow, or any other type and form of information of the connection.

In a similar embodiment, in which intermediaries such as Branch Repeaters or WANscalers, manufactured by Citrix Systems, are deployed to accelerate communications between the client and host, these communications may be compressed by the Branch Repeater or WANscaler. Accordingly, priority tags in the payload of the uncompressed packets may not be available to additional intermediaries, such as routers, between the intermediaries performing compression. Thus, by splitting virtual channels by priority into multiple TCP streams, the DSCP bits for each TCP stream may be set to allow routers to assign QoS settings without needing to inspect the payload of each packet or result to default settings where the payload is unparseable due to compression or encryption.

Figure 5:
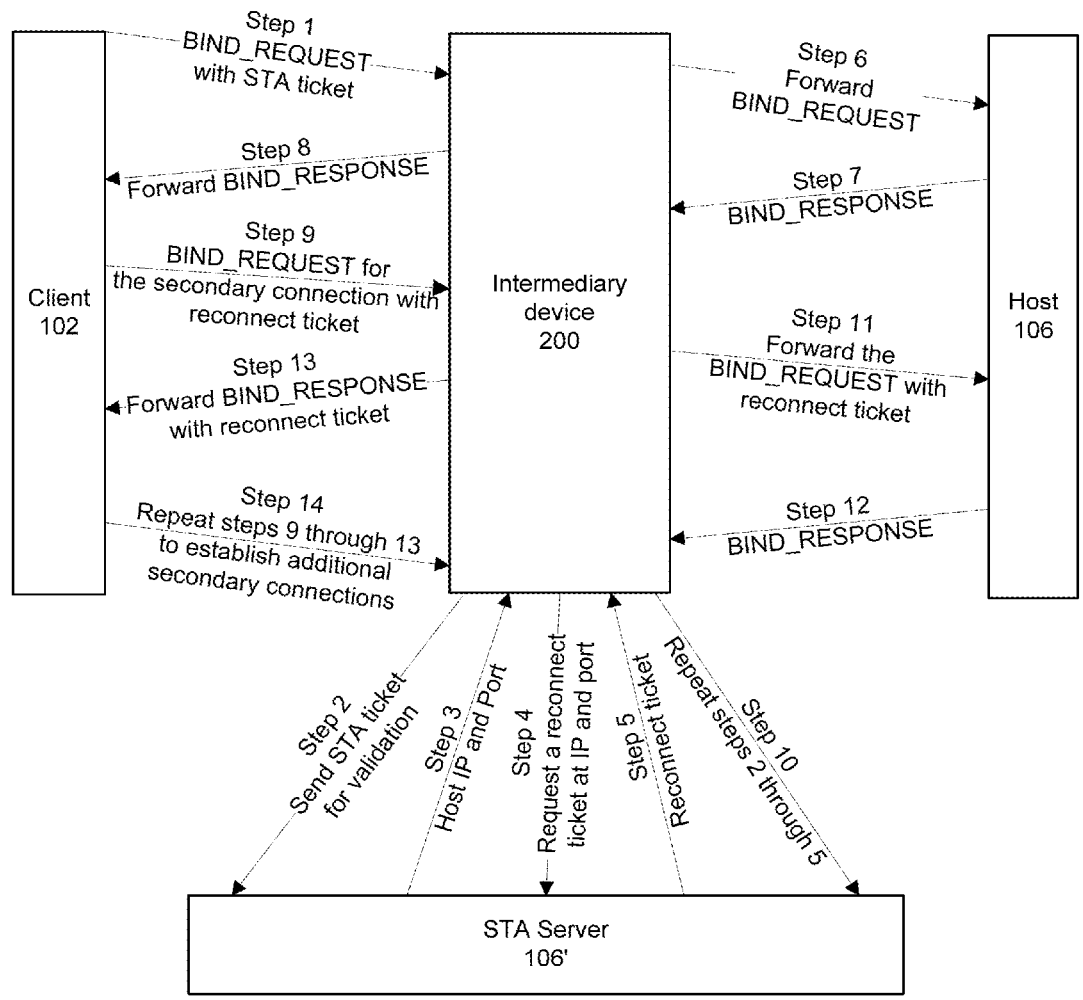
FIG. 5 is a block diagram of an embodiment of a system including an intermediary and a secure ticket authority or authentication server, in which multiple transport layer connections are utilized to carry multiple virtual channels of a session.

Illustrated in FIG. 5 is a block diagram of an embodiment of a system including an intermediary 200 and a secure ticket authority or authentication server 106', in which multiple transport layer connections are utilized to carry multiple virtual channels of a session between a client 102 and host 106.

In some embodiments, the intermediary may be used for routing communications from a client 102 to servers 106, and thus may comprise a gateway for access to a corporate network or other protected area. In many embodiments, the gateway may include authentication services. In some embodiments, the gateway may comprise an Access Gateway, manufactured by Citrix Systems.

In many embodiments, intermediary device 200 may support remote-display protocol sessions. Once a session is authentication, data from a single stream or TCP connection may be proxied by the intermediary between the host and client. The intermediary device may further be configured to support multiple remote-display protocol streams in the same session. The client may transfer virtual channels from a current stream to a different stream in the session, as discussed above. The intermediary may support multiple streams for the same session, validating the streams, and proxying data and messages to the output connections corresponding to the multiple streams.

In brief overview, a single stream common gateway protocol (CGP) connection is established via the intermediary device as a proxy. First, an SSL connection may be established to the intermediary device. The client may start the handshake process by sending a client signature and a bind request (step 1). The bind request and/or signature may include a client capability list describing client parameters and capabilities. The request further may comprise a secure ticket authority (STA) ticket, obtained from the STA server responsive to application enumeration and selection by the client. The intermediary device 200 may extract the ticket and validate the ticket with the STA server (step 2), and once validated, the STA server may reply with an IP and port of the host to be used for the remote display protocol session (step 3). At step 4, the intermediary may send a second request to the STA server with the received IP and port to get a reconnect ticket, returned at step 5.

At step 6, the intermediary forwards the request to the host 106, and the host replies with a host signature and bind response command (step 7). The host signature and/or response may include a server capability list describing server parameters and capabilities for the particular connection. The server parameters and capabilities may be a subset of capabilities of the host that match the received capabilities from the client, and thus may be created on the basis of the client capabilities, server capabilities, and settings for the session. The response is forwarded to the client (step 8) and may include the reconnect ticket obtained from the STA server. In single stream sessions, the reconnect ticket may be used to revalidate a session in case of disruption. Tickets may only be used or validated once. Every time a new disruption occurs, a new STA validation is performed against the previous reconnect ticket and a new reconnect ticket is issued and sent back to the client. Accordingly, steps 9-13 may follow the same sequence as steps 1-8, as discussed above.

The same sequence may be used for multi-stream remote-display protocol sessions. Rather than requesting to reconnect on disruption and obtaining a new ticket, each additional stream may be established in sequence without dropping the previous stream. A new ticket is obtained with the establishment of each new stream, and is used for validating the next stream (step 14). The client uses the reconnect ticket that it got in the BIND RESPONSE to immediately establish a secondary connection, by sending another BIND REQUEST. Thus, reconnect tickets in multi-stream session are initially not used for fault tolerance but instead are overloaded to establish subsequent TCP connections (streams) in sequence for the CGP session. The ticket obtained during establishment of the last stream is unused, and may be retained to reestablish the connection in case of disruption. Thus the client iterates and uses the reconnect ticket from the previous BIND RESPONSE message to establish the next secondary connection until all secondary connections have been established. Only one valid unused CGP ticket will exist in the ICA client.

The final reconnect ticket received in the last BIND RESPONSE message is used to re-establish disrupted connections. Any connection, primary or secondary, may be disrupted but the same reconnect ticket is used to re-establish the disrupted connection using a new BIND REQUEST. The reconnect process yields a new reconnect ticket that is then passed back to the client. The client can again use this new ticket when a connection is against disrupted. If any of the disrupted connection is unable to be established then the CGP session may be disconnected, all the connections belonging to that session will be closed and the user may need to log in again, as discussed above regarding timeout expirations in FIGS. 4B and 4C.

In some embodiments, for the secondary connections, the additional port numbers specified in the STA server responses (step 3, repeated for each secondary connection), may be ignored. Instead, during step 7, the host may include an indicator of a port to use when establishing a secondary connection for the multi-stream session. The intermediary may then use this port for the new secondary connection.

Figure 6:
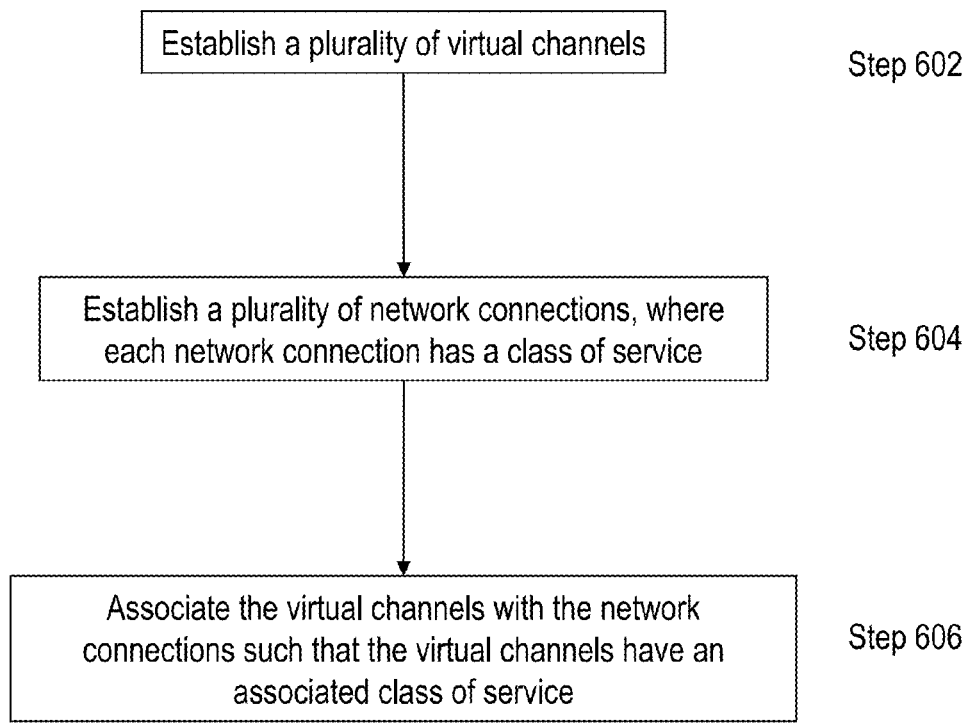
FIG. 6 is a flow chart illustrative of an embodiment of a method for allocating class of service values to virtual channels.

Illustrated in FIG. 6 is one embodiment of a method for allocating virtual channels to network connections have a class of service. The method includes establishing a plurality of virtual channels (Step 602), establishing a plurality of network connections, where each network connection has a class of service (Step 604) and associating the virtual channels with the network connections such that the virtual channels have an associated class of service (Step 606).

Further referring to FIG. 6, and in more detail, in one embodiment one or more virtual channels are established as a result of a remote application or desktop session (Step 602). A remote application session, in one embodiment, is a session where a user can access available remote applications and interact with those applications. Interaction between the user and the remote applications is facilitated by transmitting application output (e.g. graphical data generated the applications) to a client 102 and displaying the application output in an application window so that it appears as though the remote application is executing on the local client 102.

Different types of data can be transmitted during a remote application session and in some embodiments, an application delivery client can dedicate different virtual channels to different types of data. For example, one virtual channel can be dedicated to transmitting real-time data such as video conference information and audio. Another virtual channel can be dedicated to transmitting image data, while another channel can be dedicated to transmitting information associated with remotely accessible devices (e.g. USB, scanners, plug-and-play devices). Still another virtual channel can be dedicated to transmitting printer data. In some embodiments the virtual channels can connect a client 102 and a server 106. In other embodiments, an appliance 450 on the network 104 can facilitate transmission over a virtual channel between the client 102 and the server 106.

In one embodiment, a multi-channel service 415, 420 can cause one or more network connections to be established, where each connection has a class of service (Step 604). In some embodiments, the network connections can be transport layer connections, where each connection can have a different associated IP port number and IP address. An administrator can configure each network connection to have a different class of service. The class of service, in some embodiments, can represent a priority level such that traffic transmitted over a network connection have a high class of service will be transmitted before network traffic transmitted over a network connection having a lower class of service. In some embodiments, each network connection can have a unique class of service such that no two network connections can have the same class of service.

The multi-channel service 415, 420 can associate each virtual channel with a network connection such that the data transmitted over the virtual channel is transmitted with the same priority corresponding to the network connection (Step 606). For example, a first network connection can have a higher priority than a second network connection. Thus, a first virtual channel associated with the first network connection can have a higher priority than a second virtual channel associated with the second network connection. Data transmitted over the first virtual channel will therefore be transmitted with a higher level of priority than data transmitted over the second virtual channel. Associating a virtual channel with a network connection can include configuring the virtual channel to transmit data to a destination port associated with the network connection of that virtual channel. When an appliance 450 determines that the end port of a data packet is associated with a particular network connection having a particular class of service, the appliance 450 can afford that data packet a priority level commensurate with the class of service of the network connection.

In some embodiments, the methods and systems illustrated herein and the systems illustrated in may describe remote application sessions, including remote desktop sessions and/or remote application sessions. A remote desktop session, much like a remote application session, can provide remote desktops to an end user.

Figure 7:
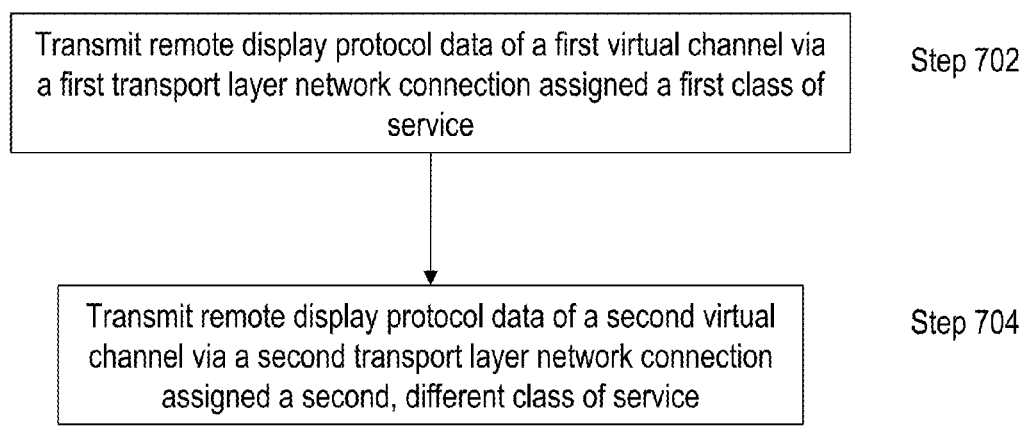
FIG. 7 is a flow chart of an embodiment of a method for allocating a different class of service to each network connection in a plurality of network connections, where each network connection corresponds to one or more virtual channels.

Referring now to FIG. 7, illustrated is a method for allocating a different class of service to each network connection of a plurality of network connections, where each network connections corresponds to one or more virtual channels. At step 702, in some embodiments, a first computing device may transmit remote-display protocol data of a first virtual channel of a remote display protocol session via a first transport layer network connection to a second computing device. In some embodiments, the first computing device may comprise a client, while in other embodiments, the first computing device may comprise a server. The remote display protocol session may comprise an ICA session, an RDP session or other remote desktop protocol session, or any other type and form of remote display protocol session comprising a plurality of virtual channels. In some embodiments, the first computing device may determine whether to transmit remote-display protocol data via the first virtual channel or the second virtual channel, or via the first transport layer network connection or second transport layer connection, responsive to the class of service of the network connection and one of a content type, application type, or user of the data. At step 704, in some embodiments, the first computing device may transmit remote-display protocol data of a second virtual channel of the remote display protocol session via a second transport layer network connection to the second computing device.

The first transport layer network connection may be assigned a first class of service, and the second transport layer network connection may be assigned a second class of service. The first class of service and second class of service may be different. In other embodiments, the first class of service and second class of service may be the same. In some embodiments, the first computing device may transmit additional remote-display protocol data of additional virtual channels via one or more additional transport layer network connections. Each transport layer network connection may be assigned a different class of service. Accordingly, in some embodiments, the first computing device may establish four transport layer network connections for the single remote display protocol session, six connections, or eight connections, each with a different class of service value.

In some embodiments, the first transport layer network connection may be assigned a first port number, and the second transport layer network connection may be assigned a second port number different from the first port number. In other embodiments, the first and the second transport layer network connection may have the same port number, but be directed to different destination IP addresses, which may comprise a plurality of virtual IP addresses maintained by the second computing device.

In one embodiment, the first class of service may be based on a type of remote-display protocol data of the first virtual channel, and the second class of service may be based on a type of remote-display protocol data of the second virtual channel. For example, the first virtual channel may carry thinwire data or application graphical output data, and the first class of service may be a high priority class of service, such as an excellent effort or critical application priority. The second virtual channel may carry printer data, and the second class of service may be a low or background priority level.

In some embodiments, the first class of service may be based on a first transmission priority of the first virtual channel, and the second class of service may be based on a second transmission priority of the second virtual channel different from the first transmission priority. For example, as discussed above, each virtual channel may be associated with a transmission priority. In these embodiments, the class of service may correspond to the transmission priority. For example, a background transmission priority may be assigned a background class of service. In a further embodiment, the first computing device may transmit the remote-display protocol data to the second computing device via one or more intermediary computing devices, such as routers, gateways, switches, firewalls, traffic shapers, or other devices. The intermediary computing device may perform various traffic prioritization techniques to the first transport layer network connection based on the first class of service and agnostic to the remote-display protocol data in the first virtual channel, and to the second transport layer network connection based on the second class of service and agnostic to the remote-display protocol data in the second virtual channel. In some embodiments, the intermediary computing device may assign transmission priorities to one or more of the transport layer network connections. For example, the intermediary computing device may assign transmission priorities according to a policy applied to one or more of a source IP, destination IP, source port, destination port, data string in an options field or other header field, payload size, or any other information. Accordingly, even if the intermediary is unable to parse or interpret the transmission priority tags of the virtual channels or remote-display protocol, or unable to detect the type of data carried by each virtual channel, the intermediary may still perform network prioritization and traffic shaping to provide enhanced QoS.

Figure 8:
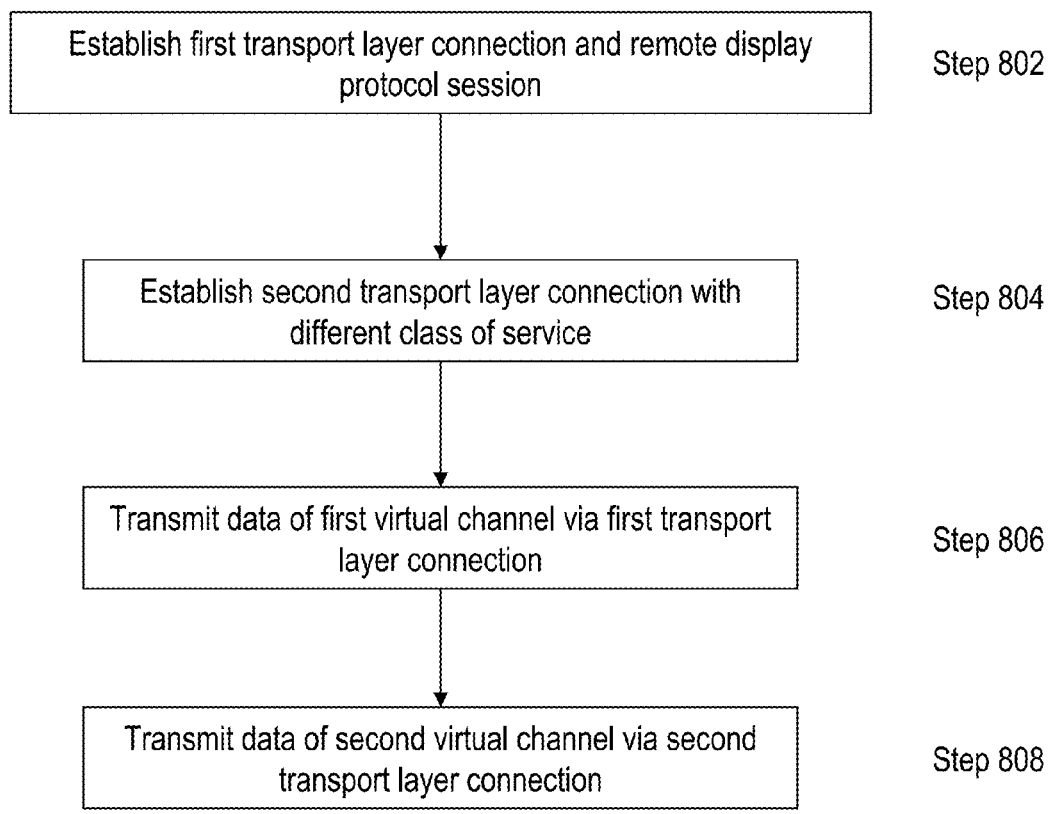
FIG. 8 is a flow chart of another embodiment of a method for allocating a different class of service to each network connection in a plurality of network connections, where each network connection corresponds to one or more virtual channels.

Referring now to FIG. 8, illustrated is a flow chart of another embodiment of a method for allocating a different class of service to each network connection in a plurality of network connections, where each network connection corresponds to one or more virtual channels. At step 802, a first computing device may establish a remote-display protocol session with a second computing device via a first transport layer connection. The first transport layer connection may be assigned a first class of service, and the remote-display protocol session may comprise a plurality of virtual channels. In some embodiments, establishing a remote-display protocol session may comprise performing a handshaking procedure on the first transport layer connection, such as the three-way handshake of TCP. In other embodiments, establishing the remote-display protocol session may comprise exchanging one or more configuration or synchronization messages, as discussed above. In some embodiments, establishing the remote-display protocol session may comprise transmitting a request to establish the remote-display protocol session to the second device. In other embodiments, establishing the remote-display protocol session may comprise establishing the remote-display protocol session responsive to receiving a request to establish the remote-display protocol session from the second computing device.

At step 804, the first computing device may establish a second transport layer connection with the second computing device, the second transport layer connection assigned a second class of service that may be different from the first class of service. As discussed above, establishing the second transport layer connection may comprise performing various handshaking and synchronization procedures at the transport layer, as well as the multi-stream handshaking and synchronization procedures discussed above. Establishing the second transport layer connection may comprise exchanging a client cookie and server cookie to identify the second transport layer connection as associated with the remote-display protocol session. In some embodiments, establishing the second transport layer connection may comprise transmitting a request to establish the second transport layer connection to the second device. In other embodiments, establishing the second transport layer connection may comprise establishing the second transport layer connection responsive to receiving a request to establish the second transport layer connection from the second computing device. Accordingly, in some embodiments, the same device may establish the first transport layer connection and second transport layer connection, while in other embodiments, these tasks may be split between the first and second computing devices.

At step 806, in some embodiments, the first computing device may transmit remote-display protocol data of a first virtual channel of the remote-display protocol session via the first transport layer connection, responsive to a priority of the first virtual channel corresponding to the first class of service. For example, in an embodiment in which the first class of service is a high priority class of service, and the first virtual channel has a corresponding high priority tag, the first computing device may transmit the remote-display protocol data of the first virtual channel via the first transport layer connection.

At step 808, in some embodiments, the first computing device may transmit remote-display protocol data of a second virtual channel of the remote-display protocol session via the second transport layer connection, responsive to a priority of the second virtual channel corresponding to the second class of service.

In some embodiments, the priority of the first virtual channel may be assigned responsive to one of a content type, application type, or user of the remote-display protocol data of the first virtual channel. In other embodiments, the priority of the second virtual channel may be assigned responsive to one of a content type, application type, or user of the remote-display protocol data of the second virtual channel. In some embodiments, the remote-display protocol data of the first and second virtual channels may be transmitted via an intermediary computing device configured to perform traffic prioritization based on the first class of service and the second class of service, and agnostic to the remote-display protocol data of the first virtual channel and second virtual channel. Accordingly, even if the intermediary is unable to parse or interpret the transmission priority tags of the virtual channels or remote-display protocol, or unable to detect the type of data carried by each virtual channel, the intermediary may still perform network prioritization and traffic shaping to provide enhanced QoS.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A system for allocating a different quality of service to each network connection in a plurality of network connections, where each network connection corresponds to one or more virtual channels, the system comprising:
    a first computing device; and
    a second computing device in communication with the first computing device via a remote-display protocol session, the remote-display protocol session comprising a plurality of virtual channels, each servicing at least a portion of network traffic of the remote-display protocol session,
    a plurality of transport layer network connections comprising a network connection between the first computing device and the second computing device, a first transport layer network connection carrying a first virtual channel and assigned a first quality of service, the first virtual channel configured to transmit remote display protocol data via the first transport layer network connection responsive to the first quality of service and one of an application type and a user of the data, and a second transport layer network connection carrying a second virtual channel and assigned a second quality of service, the second quality of service different from the first quality of service; and
    an intermediary device to perform network prioritization on the plurality of transport layer network connections, wherein a priority of the second virtual channel corresponding to the second quality of service is assigned responsive to a content type, the content type comprising at least one of voice, video, and audio content.

2. The system of claim 1, wherein the first transport layer network connection is assigned a first port number and the second transport layer network connection is assigned a second port number, the second port number different from the first port number.

3. The system of claim 2, wherein the first port number is based on the type of data communicated via the first virtual channel carried by the first transport layer network connection, and wherein the second port number is based on the type of data communicated via the second virtual channel carried by the second transport layer network connection.

4. The system of claim 1, wherein the first quality of service corresponds to a first transmission priority of the first virtual channel carried by the first transport layer network connection, and wherein the second quality of service corresponds to a second transmission priority of the second virtual channel carried by the second transport layer network connection.

5. The system of claim 4, wherein the first transmission priority is different from the second transmission priority.

6. The system of claim 4, wherein the first transmission priority is based on the type of data communicated via the first virtual channel carried by the first transport layer network connection, and wherein the second transmission priority is based on the type of data communicated via the second virtual channel carried by the second transport layer network connection.

7. A method for allocating a different quality of service to each network connection of a plurality of network connections, where each network connection corresponds to one or more virtual channels, the method comprising:
    transmitting, by a first computing device, remote-display protocol data of a first virtual channel of a remote-display protocol session via a first transport layer network connection to a second computing device, the first transport layer network connection assigned a first quality of service;
    determining, by the first computing device, to transmit remote-display protocol data of the first virtual channel of the remote-display protocol session via the first transport layer network connection, responsive to the first quality of service and one of an application type and a user of the data;
    transmitting, by the first computing device, remote-display protocol data of a second virtual channel of the remote-display protocol session via a second transport layer network connection to the second computing device, the second transport layer connection assigned a second quality of service different from the first quality of service; and
    performing, by an intermediary device, network prioritization on the plurality of transport layer network connections, a priority of the second virtual channel corresponding to the second quality of service and assigned responsive to a content type, the content type comprising at least one of voice, video, and audio content.

8. The method of claim 7, wherein the first transport layer network connection is assigned a first port number, and the second transport layer network connection is assigned a second port number different from the first port number.

9. The method of claim 7, wherein the first quality of service is based on a type of remote-display protocol data of the first virtual channel, and the second quality of service is based on a type of remote-display protocol data of the second virtual channel.

10. The method of claim 7, wherein the first quality of service is based on a transmission priority of the first virtual channel different from the priority of the second virtual channel.

11. The method of claim 10, further comprising:
    transmitting remote-display protocol data of the first virtual channel of the remote-display protocol session via the first transport layer network connection to the second computing device via the intermediary device performing traffic prioritization based on the first quality of service and agnostic to the remote-display protocol data; and
    transmitting remote-display protocol data of the second virtual channel of the remote-display protocol session via the second transport layer network connection to the second computing device via the intermediary device performing traffic prioritization based on the second quality of service and agnostic to the remote-display protocol data.

12. The method of claim 7, further comprising determining to transmit remote-display protocol data of the first virtual channel of the remote-display protocol session via the first transport layer network connection, responsive to the content type.

13. A method for allocating a different quality of service to each network connection in a plurality of network connections, where each network connection corresponds to one or more virtual channels, the method comprising:
   establishing, by a first computing device, a remote-display protocol session with a second computing device via a first transport layer connection, the first transport layer connection assigned a first quality of service and the remote-display protocol session comprising a plurality of virtual channels;
   establishing, by the first computing device, a second transport layer connection with the second computing device, the second transport layer connection assigned a second quality of service different from the first quality of service;
   transmitting, by the first computing device, remote-display protocol data of a first virtual channel of the remote-display protocol session via the first transport layer connection, responsive to a priority of the first virtual channel corresponding to the first quality of service, wherein the priority of the first virtual channel is assigned responsive to one of an application type and a user of the remote-display protocol data of the first virtual channel;
   transmitting, by the first computing device, remote-display protocol data of a second virtual channel of the remote-display protocol session via the second transport layer connection, responsive to a priority of the second virtual channel corresponding to the second quality of service; and
   performing, by an intermediary device, network prioritization on the plurality of transport layer network connections, the priority of the second virtual channel assigned responsive to a content type, the content type comprising at least one of voice, video, and audio content.

14. The method of claim 13, wherein establishing a remote-display protocol session comprises transmitting a request to establish the remote-display protocol session to the second computing device.

15. The method of claim 13, wherein establishing a remote-display protocol session comprises establishing the remote-display protocol session responsive to receiving a request to establish the remote-display protocol session from the second computing device.

16. The method of claim 13, wherein establishing the second transport layer connection comprises transmitting a request to establish the second transport layer connection to the second computing device.

17. The method of claim 13, wherein establishing the second transport layer connection comprises establishing the second transport layer request responsive to receiving a request to establish the second transport layer connection from the second computing device.

18. The method of claim 13, wherein establishing the second transport layer connection further comprises establishing the second transport layer connection responsive to the priority of the second virtual channel being different from the priority of the first virtual channel.

19. The method of claim 13, wherein transmitting the remote-display protocol data of the first virtual channel comprises transmitting the remote-display protocol data via the intermediary device performing traffic prioritization based on the first quality of service and agnostic to the remote-display protocol data of the first virtual channel, and wherein transmitting the remote-display protocol data of the second virtual channel comprises transmitting the remote-display protocol data via the intermediary device performing traffic prioritization based on the second quality of service and agnostic to the remote-display protocol data of the second virtual channel.

* * * * *